United States Patent
Zhang et al.

(10) Patent No.: US 12,490,228 B2
(45) Date of Patent: Dec. 2, 2025

(54) LOCATION OBTAINING METHOD AND APPARATUS THEREOF

(71) Applicant: Huawei Technologies Co., Ltd., Shenzhen (CN)

(72) Inventors: Chengchen Zhang, Shanghai (CN); Qianghua Zhu, Reading (GB)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 404 days.

(21) Appl. No.: 18/167,583

(22) Filed: Feb. 10, 2023

(65) Prior Publication Data

US 2023/0189204 A1 Jun. 15, 2023

Related U.S. Application Data

(63) Continuation of application No. PCT/CN2021/111008, filed on Aug. 5, 2021.

(30) Foreign Application Priority Data

Aug. 12, 2020 (CN) .......................... 202010817055.7

(51) Int. Cl.
*H04W 64/00* (2009.01)
(52) U.S. Cl.
CPC ................................. *H04W 64/006* (2013.01)
(58) Field of Classification Search
CPC ......... H04L 67/12; H04L 67/52; H04L 67/10; H04L 63/0407; H04L 2209/80; H04L 41/08; H04L 67/535; H04L 5/0078; H04W 64/00; H04W 4/02; H04W 4/023; H04W 4/40; H04W 4/029; H04W 4/021; H04W 4/025; H04W 4/50; H04W 12/63; H04W 4/024; H04W 40/20; H04W 88/02; H04W 36/322; H04W 4/027; G06F 40/40; G06F 2221/2111; G06F 2221/2137; G06F 21/43; G06F 1/3209; G06F 16/587; H04M 1/72457; H04M 2242/30; H04M 3/42357; H04M 2207/18; H04M 2215/7435

See application file for complete search history.

(56) References Cited

U.S. PATENT DOCUMENTS

| | | | |
|---|---|---|---|
| 9,671,791 B1 | 6/2017 | Paczan | |
| 2008/0200182 A1* | 8/2008 | Shim | H04W 64/00 455/456.1 |
| 2010/0112989 A1* | 5/2010 | Andreasson | H04L 67/52 455/414.2 |

(Continued)

OTHER PUBLICATIONS

3GPP TSG-SA WG2 Meeting #139E, S2-2004081, "KI#4, New Sol: UAV and UAV Controller tracking based on LCS mechanism", CATT, Jun. 1-12, 2020, 3 pages.

(Continued)

*Primary Examiner* — Nimesh Patel
(74) *Attorney, Agent, or Firm* — Conley Rose, P.C.

(57) ABSTRACT

A location obtaining method includes requesting, from a network, to obtain locations of a first terminal device and a second terminal device at a same time point, and receiving the locations that are fed back by the network and that are of the first terminal device and the second terminal device at the same time point. The locations of the first terminal device and the second terminal device at the same time point are obtained.

20 Claims, 9 Drawing Sheets

(56) References Cited

U.S. PATENT DOCUMENTS

2010/0250727 A1    9/2010   King et al.
2018/0091949 A1*   3/2018   Steiner .................. H04W 4/027
2019/0141474 A1*   5/2019   de la Broise ........... H04L 67/52
2020/0053638 A1*   2/2020   Edge ................... H04W 64/003

OTHER PUBLICATIONS

3GPP TS 23.271 V16.0.0, "3rd Generation Partnership Project; Technical Specification Group Services and System Aspects; Functional stage 2 description of Location Services (LCS) (Release 16)," Jul. 2020, 188 pages.

3GPP TS 23.273 V17.5.0, "3rd Generation Partnership Project; Technical Specification Group Services and System Aspects;5G System (5GS) Location Services (LCS);Stage 2(Release 17)", Jun. 2022, 107 pages.

3GPP TSG-SA WG2 Meeting #139E S2-2004680,"KI#4, New Sol: UAV and UAVC tracking and flight route analysis based on NWDAF", CATT, Jun. 1-12, 2020, 3 pages.

3GPP TSG-SA WG2 Meeting #139E S2-2004681, "KI#4, New Sol: UAV and UAV Controller tracking based on LCS mechanism", CATT, Jun. 1-12, 2020, 3 pages.

* cited by examiner

LOCATION OBTAINING METHOD AND APPARATUS THEREOF

CROSS-REFERENCE TO RELATED APPLICATIONS

This is a continuation of International Patent Application No. PCT/CN2021/111008 filed on Aug. 5, 2021, which claims priority to Chinese Patent Application No. 202010817055.7 filed on Aug. 12, 2020. The disclosures of the aforementioned applications are hereby incorporated by reference in their entireties.

TECHNICAL FIELD

This disclosure relates to the field of communication technologies, and in particular, to a location obtaining method and an apparatus thereof.

BACKGROUND

With continuous development of society, science, and technology, people's requirements on navigation and positioning are not limited to only positioning a terminal device. In many scenarios, a plurality of terminal devices needs to be positioned, to obtain a distance between any two of the terminal devices. For example, an uncrewed aerial vehicle (UAV) and an uncrewed aerial vehicle controller (UAVC) are positioned, to obtain a distance between the UAV and the UAVC. This helps better manage the UAV.

However, most terminal devices are mobile. Positioning terminal devices in a moving process causes low accuracy of a calculated distance between the devices.

SUMMARY

Embodiments of this disclosure provide a location obtaining method and an apparatus thereof. Locations of a first terminal device and a second terminal device at a same time point are obtained, to improve accuracy of calculating a distance between the first terminal device and the second terminal device.

According to a first aspect, an embodiment of this disclosure provides a location obtaining method. The method includes requesting, from a network, to obtain locations of a first terminal device and a second terminal device at a same time point; and receiving, from the network, the locations of the first terminal device and the second terminal device at the same time point.

In this technical solution, the locations of the first terminal device and the second terminal device at the same time point are obtained. Further, a distance between the first terminal device and the second terminal device may be calculated based on the locations of the first terminal device and the second terminal device at the same time point. Because the locations of the first terminal device and the second terminal device are obtained at the same time point, accuracy of calculating the distance between the first terminal device and the second terminal device is improved.

In an implementation, a specific implementation of requesting, from a network, to obtain locations of a first terminal device and a second terminal device at a same time point may be sending a first location request to a first network device, where the first network device serves the first terminal device and the second terminal device, and the first location request is for requesting to obtain the locations of the first terminal device and the second terminal device at the same time point. A specific implementation of receiving, from the network, the locations of the first terminal device and the second terminal device at the same time point may be receiving first location information from the first network device, where the first location information includes the locations of the first terminal device and the second terminal device at the same time point.

In this technical solution, the first terminal device and the second terminal device may correspond to a same network device or different network devices. When the first terminal device and the second terminal device correspond to the same network device, a location request (the first location request) is sent to the network device, so that the locations of the first terminal device and the second terminal device at the same time point may be obtained.

In an implementation, the first location request includes first time information, and the first time information indicates a first moment. The first location request is for requesting to obtain locations of the first terminal device and the second terminal device at the first moment.

In an implementation, the first time information includes the first moment or first duration, and the first duration indicates the first moment.

In an implementation, the first location request includes first indication information, and the first indication information indicates to obtain the locations of the first terminal device and the second terminal device at the same time point.

In an implementation, the method may further include determining deviation time information of the first terminal device, where the deviation time information is determined based on a time point of positioning a historical location of the first terminal device and a time point of positioning a historical location of the second terminal device. The first location request may include the deviation time information, and the deviation time information is for adjusting a time point of positioning the location of the first terminal device, to enable obtaining the locations of the first terminal device and the second terminal device at the same time point.

In this technical solution, a time point of positioning one of the first terminal device and the second terminal device (the first terminal device is used as an example) is adjusted, so that the locations of the first terminal device and the second terminal device at the same time point may be obtained, and a time point of positioning the locations of the first terminal device and the second terminal device does not need to be adjusted. This helps reduce overheads.

In an implementation, the first location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the first location information further includes a time accuracy result, and the time accuracy result indicates whether the locations of the first terminal device and the second terminal device satisfy the time accuracy requirement.

In an implementation, a specific implementation of requesting, from a network, to obtain locations of a first terminal device and a second terminal device at a same time point may be sending a second location request to a second network device and sending a third location request to a third network device, where the second location request is for requesting to obtain a location of the first terminal device at a first moment and the third location request is for requesting to obtain a location of the second terminal device at the first moment. A specific implementation of receiving, from the network, the locations of the first terminal device and the second terminal device at the same time point may be receiving second location information from the second network device and receiving third location information from the third network device, where the second location information includes the location of the first terminal device at the first moment and the third location information includes the location of the second terminal device at the first moment.

In an implementation, both the second location request and the third location request include first time information, and the first time information indicates the first moment.

In an implementation, the first time information includes the first moment or first duration, and the first duration indicates the first moment.

In an implementation, the method may further include determining deviation time information of the first terminal device, where the deviation time information is determined based on a time point of positioning a historical location of the first terminal device and a time point of positioning a historical location of the second terminal device. The second location request may include the deviation time information, and the deviation time information enables adjusting a time point of positioning the location of the first terminal device to the first moment.

In this technical solution, a time point of positioning one of the first terminal device and the second terminal device (the first terminal device is used as an example) is adjusted, so that the locations of the first terminal device and the second terminal device at the same time point may be obtained, and a time point of positioning the locations of the first terminal device and the second terminal device does not need to be adjusted. This helps reduce overheads.

In an implementation, the second location request and the third location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the second location information may further include a time accuracy result, and the time accuracy result indicates whether the location of the first terminal device satisfies the time accuracy requirement.

In an implementation, the second network device may be a network device serving the first terminal device; a first measurement device that positions the first terminal device; the first terminal device; or an access network device serving the first terminal device.

According to a second aspect, an embodiment of this disclosure provides another location obtaining method that may be applied to a first network device. The first network device serves a first terminal device and a second terminal device. The method includes receiving a first location request, where the first location request is for requesting to obtain locations of a first terminal device and a second terminal device at a same time point; and sending first location information, where the first location information includes location information of the first terminal device and the second terminal device at the same time point.

In this technical solution, the first terminal device and the second terminal device may correspond to a same network device or different network devices. When the first terminal device and the second terminal device correspond to the same network device (namely, the first network device), when receiving a location request (the first location request), the first network device may obtain the locations of the first terminal device and the second terminal device at the same time point.

In an implementation, the first location request includes first time information, and the first time information indicates a first moment. The first location request is for requesting to obtain locations of the first terminal device and the second terminal device at the first moment.

In an implementation, the first time information includes the first moment or first duration, and the first duration indicates the first moment.

In an implementation, the first location request includes first indication information, and the first indication information indicates to obtain the locations of the first terminal device and the second terminal device at the same time point. The method may further include determining a first moment, and obtaining locations of the first terminal device and the second terminal device at the first moment.

In an implementation, the first location request may include deviation time information of the first terminal device, and the deviation time information is determined based on a time point of positioning a historical location of the first terminal device and a time point of positioning a historical location of the second terminal device. The deviation time information is for adjusting a time point of positioning the location of the first terminal device, to enable obtaining the locations of the first terminal device and the second terminal device at the same time point.

In this technical solution, a time point of positioning one of the first terminal device and the second terminal device (the first terminal device is used as an example) is adjusted, so that the locations of the first terminal device and the second terminal device at the same time point may be obtained, and a time point of positioning the locations of the first terminal device and the second terminal device does not need to be adjusted. This helps reduce overheads.

In an implementation, the first location request may include at least one of the following a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the first location information further includes a time accuracy result, and the time accuracy result indicates whether the locations of the first terminal device and the second terminal device satisfy the time accuracy requirement.

According to a third aspect, an embodiment of this disclosure provides still another location obtaining method that may be applied to a second network device. The method includes receiving a second location request, where the second location request is for requesting to obtain a location of a first terminal device at a first moment; and sending second location information, where the second location information includes the location of the first terminal device at the first moment.

In an implementation, the second location request includes first time information, and the first time information indicates the first moment.

In an implementation, the first time information includes the first moment or first duration, and the first duration indicates the first moment.

In an implementation, the second location request may include deviation time information of the first terminal device, and the deviation time information is determined based on a time point of positioning a historical location of the first terminal device and a time point of positioning a historical location of a second terminal device. The deviation time information enables adjusting a time point of positioning the location of the first terminal device to the first moment.

In this technical solution, a time point of positioning one of the first terminal device and the second terminal device (the first terminal device is used as an example) is adjusted, so that the locations of the first terminal device and the second terminal device at the same time point (the first moment) may be obtained, and a time point of positioning the locations of the first terminal device and the second terminal device does not need to be adjusted. This helps reduce overheads.

In an implementation, the second location request may include at least one of the following: a time accuracy requirement, where the time accuracy requirement indicates time accuracy that needs to be satisfied by the time point of positioning the location of the first terminal device; and second time information, where the second time information indicates that the time point of positioning the location of the first terminal device needs to be earlier than a second moment.

In an implementation, the first location information further includes a time accuracy result, and the time accuracy result indicates whether the location of the first terminal device satisfies the time accuracy requirement.

According to a fourth aspect, an embodiment of this disclosure provides a communication apparatus. The communication apparatus has some or all functions of the execution body in the method examples in the first aspect. For example, the functions of the communication apparatus may have functions of some or all embodiments of this disclosure, or may have a function of independently implementing any embodiment in this disclosure. The function may be implemented by hardware, or may be implemented by hardware executing corresponding software. The hardware or the software includes one or more units or modules corresponding to the functions.

In an implementation, a structure of the communication apparatus may include a processing unit and a communication unit. The processing unit is configured to support the communication apparatus in performing corresponding functions in the foregoing method. The communication unit is configured to support communication between the communication apparatus and another device. The communication apparatus may further include a storage unit. The storage unit is configured to be coupled to the processing unit and the communication unit, and stores a computer program and data that are necessary for the communication apparatus.

In an implementation, the communication apparatus includes the processing unit, configured to invoke the communication unit to request, from a network, to obtain locations of a first terminal device and a second terminal device at a same time point; and further configured to invoke the communication unit to receive, from the network, the locations of the first terminal device and the second terminal device at the same time point.

In an example, the processing unit may be a processor, the communication unit may be a transceiver, and the storage unit may be a memory.

In an implementation, the communication apparatus includes the processor, configured to invoke the transceiver to request, from a network, to obtain locations of a first terminal device and a second terminal device at a same time point; and further configured to invoke the transceiver to receive, from the network, the locations of the first terminal device and the second terminal device at the same time point.

According to a fifth aspect, an embodiment of this disclosure provides another communication apparatus. The communication apparatus has some or all functions of the first network device in the method examples in the second aspect. For example, the functions of the communication apparatus may have functions of some or all embodiments of this disclosure, or may have a function of independently implementing any embodiment in this disclosure. The function may be implemented by hardware, or may be implemented by hardware executing corresponding software. The hardware or the software includes one or more units or modules corresponding to the functions.

In an implementation, a structure of the communication apparatus may include a processing unit and a communication unit. The processing unit is configured to support the communication apparatus in performing corresponding functions in the foregoing method. The communication unit is configured to support communication between the communication apparatus and another device. The communication apparatus may further include a storage unit. The storage unit is configured to be coupled to the processing unit and the communication unit, and stores a computer program and data that are necessary for the communication apparatus.

In an implementation, the communication apparatus includes the processing unit, configured to invoke the communication unit to receive a first location request, where the first location request is for requesting to obtain locations of a first terminal device and a second terminal device at a same time point, and the communication apparatus serves the first terminal device and the second terminal device; and further configured to invoke the communication unit to send first location information, where the first location information includes location information of the first terminal device and the second terminal device at the same time point.

In an example, the processing unit may be a processor, the communication unit may be a transceiver, and the storage unit may be a memory.

In an implementation, the communication apparatus includes the processor, configured to invoke the transceiver to receive a first location request, where the first location request is for requesting to obtain locations of a first terminal device and a second terminal device at a same time point, and the communication apparatus serves the first terminal device and the second terminal device; and further configured to invoke the transceiver to send first location information, where the first location information includes location information of the first terminal device and the second terminal device at the same time point.

According to a sixth aspect, an embodiment of this disclosure provides still another communication apparatus. The communication apparatus has some or all functions of the second network device in the method examples in the third aspect. For example, the functions of the communication apparatus may have functions of some or all embodiments of this disclosure, or may have a function of independently implementing any embodiment in this disclosure. The function may be implemented by hardware, or may be implemented by hardware executing corresponding software. The hardware or the software includes one or more units or modules corresponding to the functions.

In an implementation, a structure of the communication apparatus may include a processing unit and a communication unit. The processing unit is configured to support the communication apparatus in performing corresponding functions in the foregoing method. The communication unit is configured to support communication between the communication apparatus and another device. The communication apparatus may further include a storage unit. The storage unit is configured to be coupled to the processing unit and the communication unit, and stores a computer program and data that are necessary for the communication apparatus.

In an implementation, the communication apparatus includes the processing unit, configured to invoke the communication unit to receive a second location request, where the second location request is for requesting to obtain a location of a first terminal device at a first moment; and further configured to invoke the communication unit to send second location information, where the second location information includes the location of the first terminal device at the first moment.

In an example, the processing unit may be a processor, the communication unit may be a transceiver, and the storage unit may be a memory.

In an implementation, the communication apparatus includes the processor, configured to invoke the transceiver to receive a second location request, where the second location request is for requesting to obtain a location of a first terminal device at a first moment; and further configured to invoke the transceiver to send second location information, where the second location information includes the location of the first terminal device at the first moment.

According to a seventh aspect, an embodiment of this disclosure provides a location obtaining system. The system includes one or more communication apparatuses in the fourth aspect to the sixth aspect.

According to an eighth aspect, an embodiment provides a computer-readable storage medium. The computer-readable storage medium stores a computer program, the computer program includes program instructions, and when the program instructions are executed by a communication apparatus, the communication apparatus is enabled to perform the method according to the first aspect.

According to a ninth aspect, an embodiment provides a computer-readable storage medium. The computer-readable storage medium stores a computer program, the computer program includes program instructions, and when the program instructions are executed by a communication apparatus, the communication apparatus is enabled to perform the method according to the second aspect.

According to a tenth aspect, an embodiment provides a computer-readable storage medium. The computer-readable storage medium stores a computer program, the computer program includes program instructions, and when the program instructions are executed by a communication apparatus, the communication apparatus is enabled to perform the method according to the third aspect.

According to an eleventh aspect, this disclosure further provides a computer program product including a computer program. When the computer program product runs on a computer, the computer is enabled to perform the method according to the first aspect.

According to a twelfth aspect, this disclosure further provides a computer program product including a computer program. When the computer program product runs on a computer, the computer is enabled to perform the method according to the second aspect.

According to a thirteenth aspect, this disclosure further provides a computer program product including a computer program. When the computer program product runs on a computer, the computer is enabled to perform the method according to the third aspect.

According to a fourteenth aspect, this disclosure provides a chip system. The chip system includes at least one processor and an interface, and is configured to implement a function in the first aspect, for example, receive, send, or process at least one of data and information in the foregoing method. In a possible design, the chip system further includes a memory, and the memory is configured to store a computer program and data that are necessary. The chip system may include a chip, or may include a chip and another discrete component.

According to a fifteenth aspect, this disclosure provides a chip system. The chip system includes at least one processor and an interface, and is configured to support a first network device in implementing a function in the second aspect, for example, receiving, sending, or processing at least one of data and information in the foregoing method. In a possible design, the chip system further includes a memory, and the memory is configured to store a computer program and data that are necessary for the first network device. The chip system may include a chip, or may include a chip and another discrete component.

According to a sixteenth aspect, this disclosure provides a chip system. The chip system includes at least one processor and an interface, and is configured to support a second network device in implementing a function in the second aspect, for example, receiving, sending, or processing at least one of data and information in the foregoing method. In a possible design, the chip system further includes a memory, and the memory is configured to store a computer program and data that are necessary for the second network device. The chip system may include a chip, or may include a chip and another discrete component.

DESCRIPTION OF EMBODIMENTS

To better understand a location obtaining method disclosed in embodiments of this disclosure, the following first describes a communication system to which embodiments of this disclosure is applicable.

Figure 1A:
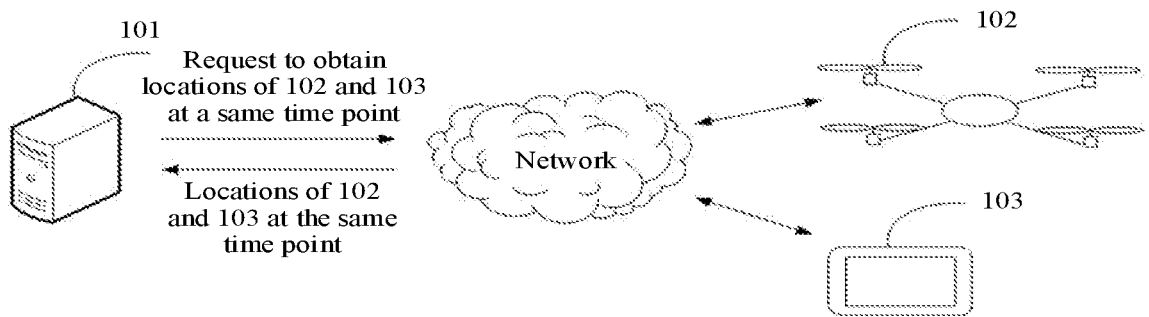
FIG. 1A is a schematic diagram of an architecture of a communication system according to an embodiment of this disclosure.

FIG. 1A is a schematic diagram of an architecture of a communication system according to an embodiment of this disclosure. The communication system may include but is not limited to one network device, one first terminal device, and one second terminal device. A quantity of devices and forms of the devices shown in FIG. 1A are used as examples, but do not constitute a limitation on this embodiment of this disclosure. During actual application, the communication system may include two or more first terminal devices and two or more second terminal devices. For example, the communication system shown in FIG. 1A includes a network device 101, a first terminal device 102, and a second terminal device 103.

The network device 101 may be configured to request, from a network, to obtain locations of the first terminal device 102 and the second terminal device 103 at a same time point, and receive, from the network, the locations of the first terminal device 102 and the second terminal device 103 at the same time point. In an implementation, a device that may be configured to obtain locations of terminal devices (for example, the first terminal device 102 and the second terminal device 103) may be deployed in the network, and the device may obtain the locations of the terminal devices at a specified moment. It may be understood that when the network device 101 requests the network to obtain the locations of the first terminal device 102 and the second terminal device 103 at the same time point, the network may obtain, by using the foregoing deployed device, the locations of the first terminal device 102 and the second terminal device 103 at the same time point, and feed back the obtained locations to the network device 101. It should be noted that one or more devices may be deployed in the network. The network may obtain, by using one deployed device, the locations of the first terminal device 102 and the second terminal device 103 at the same time point. Alternatively, the network may obtain, by using cooperation of a plurality of deployed devices, the locations of the first terminal device 102 and the second terminal device 103 at the same time point. In this embodiment of this disclosure, a quantity and names of network elements that are deployed in the network and that are for obtaining the locations of the first terminal device 102 and the second terminal device 103 at the same time point are not limited. In an implementation, the device deployed in the network may include a measurement device. The measurement device may be configured to measure a location of the first terminal device 102 and/or a location of the second terminal device 103. The measurement device may be an access network device serving the first terminal device 102 and/or the second terminal device 103. Alternatively, the measurement device may be the first terminal device 102 or the second terminal device 103.

Further, the network device 101 may calculate a distance between the first terminal device 102 and the second terminal device 103 based on the locations of the first terminal device 102 and the second terminal device 103 at the same time point. Because the locations of the first terminal device 102 and the second terminal device 103 are obtained at the same time point, accuracy of calculating the distance between the first terminal device 102 and the second terminal device 103 is improved.

It should be noted that, in addition to a scenario in which locations of a plurality of terminal devices at a same time point are requested, this embodiment of this disclosure may also be applied to a scenario in which a location of a single terminal device at a specific moment is requested. It should be further noted that the technical solution in this embodiment of this disclosure may be applied to various communication systems, for example, a Long-Term Evolution (LTE) system, a 5th generation (5G) mobile communication system, or a 5G New Radio (NR) system. Optionally, the method in this embodiment of this disclosure is further applicable to various future communication systems, for example, a 6th generation (6G) system or another communication network.

The first terminal device 102 and the second terminal device 103 in this embodiment of this disclosure are entities configured to receive or transmit a signal. One or two of the first terminal device 102 and the second terminal device 103 may move. To be specific, a location or locations of one or two of the first terminal device 102 and the second terminal device 103 may change. The terminal device (namely, the first terminal device 102 or the second terminal device 103) in this embodiment of this disclosure may be referred to as a terminal, user equipment (UE), a mobile station (MS), a mobile terminal (MT), or the like. The terminal device may be a mobile phone, a wearable device, a tablet computer (Pad), a computer having a wireless transceiver function, a virtual reality (VR) terminal device, or an augmented reality (AR) terminal device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in smart home, or the like. A specific technology and a specific device form that are used by the terminal device are not limited in this embodiment of this disclosure.

In an implementation, the first terminal device 102 and the second terminal device 103 may be devices of different types. For example, one of the first terminal device 102 and the second terminal device 103 may be a control device, and the other one may be a device controlled by the control device. As shown in FIG. 1A, the first terminal device 102 is a UAV, and the second terminal device 103 is a UAVC. In another implementation, the first terminal device 102 and the second terminal device 103 may be devices of a same type. For example, both the first terminal device 102 and the second terminal device 103 are controlled devices (such as UAVs or remote vehicles).

The network device 101 in this embodiment of this disclosure may be a network-side entity that is configured to transmit or receive a signal. The network device 101 may be a management device, a Gateway Mobile Location Center (GMLC), a network exposure function (NEF) network element, an access and mobility management function (AMF) network element, a location management function (LMF) network element, or another device that may be configured to obtain the locations of the first terminal device 102 and the second terminal device 103 at the same time point.

The management device may be configured to manage the location of the first terminal device 102 and the location of the second terminal device 103, and may be further configured to perform authorization and authentication on the first terminal device 102 and the second terminal device 103. For example, the management device may analyze the location of the first terminal device 102 and/or the location of the second terminal device 103, to determine whether the location of the first terminal device 102 or the location of the second terminal device 103 is abnormal. Alternatively, the management device may determine whether the distance between the first terminal device 102 and the second terminal device 103 is abnormal. When the first terminal device 102 is a UAV and the second terminal device 103 is a UAVC, the management device may be a network element related to tracking the UAV and the UAVC. In this case, the management device may be a UAV system traffic management (UTM), and the UTM may be deployed together with a UAV system service provider (USS). It should be noted that the management device (for example, the UTM) may be located inside a core network, or may be located outside the core network. A name and a location of a network element are not limited in this embodiment of this disclosure.

The GMLC may support a location service (LCS) function. One or more GMLCs may exist in a public land mobile network (PLMN). The NEF may be configured to provide security information from an external application procedure (such as a UAV system) to a 3rd Generation Partnership Project (3GPP) network, and may also be configured to translate internal-to-external information. The AMF may be configured to manage registration, connection, and the like of the terminal device. The LMF may be configured to manage overall coordination and scheduling of a resource required by a location of a terminal device that registers with or accesses a 5G core network.

Figure 1B:
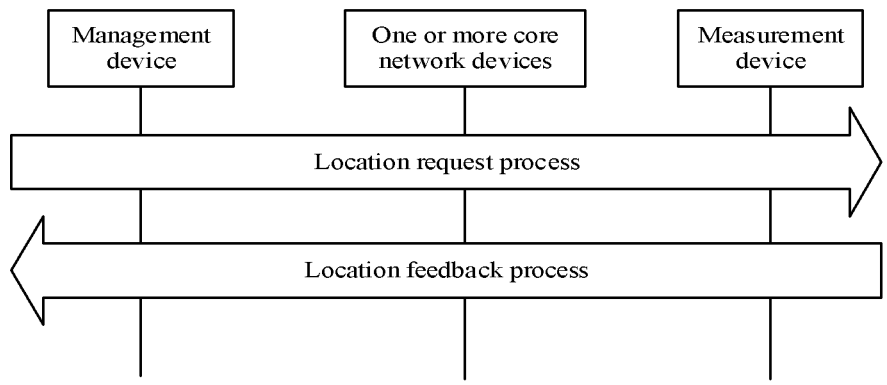
FIG. 1B is a schematic diagram of a device involved in a process of requesting to obtain a location of a terminal device at a specified moment according to an embodiment of this disclosure.

As shown in FIG. 1B, devices involved in a process of requesting to obtain a location of a terminal device (for example, a first terminal device and/or a second terminal device) at a specified moment may include a management device, one or more core network devices, and a measurement device. For example, the core network devices involved in the location request process include a GMLC, an AMF, and an LMF. When the management device needs to obtain the location of the terminal device at the specified moment, the management device may request the GMLC corresponding to the terminal device to obtain the location of the terminal device at the specified moment. The GMLC may request the AMF corresponding to the terminal device to obtain the location of the terminal device at the specified moment. The AMF may request the LMF corresponding to the terminal device to obtain the location of the terminal device at the specified moment. The LMF may request the measurement device corresponding to the terminal device to obtain the location of the terminal device at the specified moment. After obtaining the location of the terminal device at the specified moment, the measurement device may feed back the location to the LMF. Correspondingly, the LMF may feed back the location to the AMF. The AMF may feed back the location to the GMLC. Then, the GMLC feeds back the location to the management device.

It should be noted that the foregoing process may be for obtaining a location of one terminal device at a specified moment, or may be for obtaining locations of a plurality of terminal devices at a specified moment. It should be further noted that, that the management device requests, by using the GMLC corresponding to the terminal device, the AMF corresponding to the terminal device to obtain the location of the terminal device at the specified moment is merely used as an example. In another feasible implementation, the management device may alternatively directly request the AMF corresponding to the terminal device to obtain the location of the terminal device at the specified moment. Alternatively, the management device may request, by using an NEF corresponding to the terminal device, the AMF corresponding to the terminal device to obtain the location of the terminal device at the specified moment. In this embodiment of this disclosure, a quantity and names of devices involved in the process of requesting to obtain the location of the terminal device at the specified moment, and a communication manner (for example, indirect communication by using another network element or direct communication) between the devices are not limited.

It can be understood that the communication system described in embodiments of this disclosure is used to describe the technical solution in embodiments of this disclosure more clearly, but does not limit the technical solution provided in embodiments of this disclosure. A person skilled in the art may learn that with evolution of a system architecture and emergence of a new service scenario, the technical solutions provided in embodiments of this disclosure is also applicable to a similar technical problem.

The following describes in detail a location obtaining method and an apparatus thereof provided in this disclosure with reference to the accompanying drawings.

Figure 2:
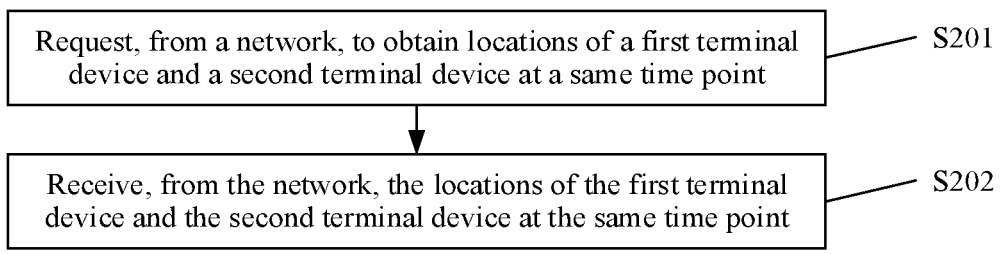
FIG. 2 is a schematic flowchart of a location obtaining method according to an embodiment of this disclosure.

FIG. 2 is a schematic flowchart of a location obtaining method according to an embodiment of this disclosure. An execution body of step S201 and step S202 may be a management device, a GMLC, an NEF, an AMF, an LMF, or another device that may be configured to obtain locations of a first terminal device and a second terminal device at a same time point. Alternatively, the execution body may be a chip in the management device, the GMLC, the NEF, the AMF, or the LMF. As shown in FIG. 2, the method may include but is not limited to the following steps.

Step S201: Request, from a network, to obtain locations of a first terminal device and a second terminal device at a same time point.

The first terminal device and the second terminal device may correspond to a same network or different networks. A location of a terminal device (for example, the first terminal device or the second terminal device) at a specified moment may be obtained by using a network corresponding to the terminal device. A measurement device configured to measure the location of the terminal device at the specified moment may be deployed in the network corresponding to the terminal device. When receiving a request for obtaining the location of the terminal device at the specified moment, the network may trigger the measurement device to position the terminal device, to obtain the location of the terminal device at the specified moment.

In this embodiment of this disclosure, the locations of the first terminal device and the second terminal device at the same time point may be obtained by requesting the network in the following two manners.

First manner: When the first terminal device and the second terminal device correspond to a same network device, the network device is requested to obtain the locations of the first terminal device and the second terminal device at the same time point. A specific implementation of requesting, from the network device, to obtain the locations of the first terminal device and the second terminal device at the same time point may be sending a first location request to a first network device, where the first location request is for requesting to obtain the locations of the first terminal device and the second terminal device at the same time point. The first network device serves the first terminal device and the second terminal device. In this embodiment of this disclosure, the first network device may be a GMLC, an NEF, an AMF, or an LMF. Correspondingly, after obtaining the locations of the first terminal device and the second terminal device at the same time point, the first network device may feed back first location information to a sender of the first location request, where the first location information includes the locations of the first terminal device and the second terminal device at the same time point. When the first terminal device and the second terminal device correspond to the same network device, a location request (the first location request) is sent to the network device, so that the locations of the first terminal device and the second terminal device at the same time point may be obtained. In this embodiment of this disclosure, to obtain the locations of the first terminal device and the second terminal device at the same time point, information included in the first location request may be classified into three cases. For details, refer to descriptions in embodiments of FIG. 3A to FIG. 5A.

It should be noted that, in this embodiment of this disclosure, a device that receives a location request (which is for obtaining a location of one terminal device at a specified moment, or obtaining locations of a plurality of terminal devices at a same time point) may support a delayed location request. Supporting the delayed location request indicates that after receiving the location request, the device may not need to immediately feed back requested location information to a sender (namely, a location requester) of the location request, but may feed back the location information after obtaining the required location information. Optionally, after receiving the location request, the device may send a location response to the location requester, where the location response may indicate that the device successfully receives the location request. The location response may carry the location information required by the location requester, or may not carry the location information required by the location requester. If the location response does not carry the location information required by the location requester, after sending the location response, the device may feed back the location information to the location requester after obtaining the location information required by the location requester. In this embodiment of this disclosure, the location information may be carried in a location event notification and sent to the location requester.

It should be further noted that, in this embodiment of this disclosure, when the location request is for requesting locations of a plurality of terminal devices at a same time point, the locations of the terminal devices may be carried in a same message and fed back to the location requester, or may be separately carried in different messages and fed back to the location requester. For example, the location of the first terminal device and the location of the second terminal device that are included in the first location information may be separately sent.

Second manner: When the first terminal device and the second terminal device correspond to different network devices, a network device corresponding to the first terminal device is requested to obtain a location of the first terminal device at a first moment, and a network device corresponding to the second terminal device is requested to obtain a location of the second terminal device at the first moment.

It should be noted that, in this embodiment of this disclosure, when a location request is sent to the network device corresponding to the first terminal device and/or the network device corresponding to the second terminal device, the location request indicates that the locations of the first terminal device and the second terminal device are expected to be obtained at a same moment (for example, the first moment). However, in an actual case, a measurement device corresponding to the first terminal device may measure, around the first moment, the location of the first terminal device. In other words, the actually obtained location of the first terminal device may not be obtained through measurement at the first moment. This is the same for the second terminal device. However, because the locations of the terminal devices (the first terminal device and the second terminal device) are actually measured based on the first moment, obtaining the locations of the first terminal device and the second terminal device in this manner helps improve accuracy of calculating a distance between the first terminal device and the second terminal device.

In an implementation, when it is expected to obtain the location of the first terminal device at the first moment, the measurement device corresponding to the first terminal device may start measurement before the first moment. Because the measurement device needs to spend time measuring the location of the first terminal device, starting measurement before the first moment can make an error between an actual moment corresponding to the location of the first terminal device obtained through measurement and the first moment (an expected moment) small, or even make the actual moment the same as the expected moment.

Step S202: Receive, from the network, the locations of the first terminal device and the second terminal device at the same time point.

If the first manner is used to request to obtain the locations of the first terminal device and the second terminal device at the same time point, correspondingly, the locations of the first terminal device and the second terminal device at the same time point that are fed back by the network corresponding to the first terminal device and the second terminal device may be received.

If the second manner is used to request to obtain the locations of the first terminal device and the second terminal device at the same time point, correspondingly, the location of the first terminal device at the first moment that is fed back by the network corresponding to the first terminal device may be received, and the location of the second terminal device at the first moment that is fed back by the network corresponding to the second terminal device is received.

In this embodiment of this disclosure, because the locations of the first terminal device and the second terminal device are obtained at the same time point, accuracy of calculating a distance between the first terminal device and the second terminal device is improved.

Figure 3A:
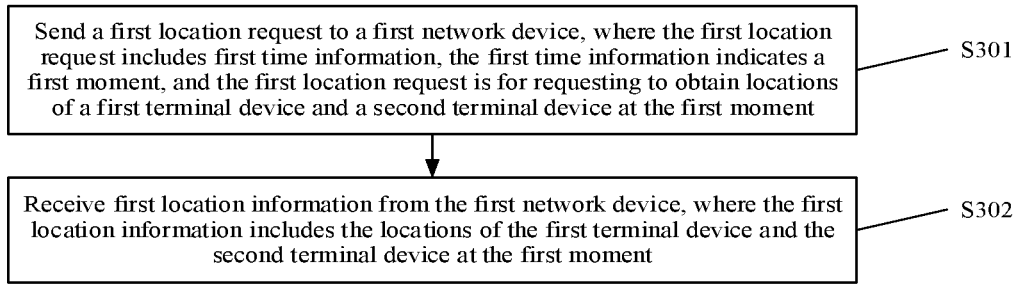
FIG. 3A is a schematic flowchart of another location obtaining method according to an embodiment of this disclosure.

FIG. 3A is a schematic flowchart of another location obtaining method according to an embodiment of this disclosure. The method describes in detail how to obtain locations of a first terminal device and a second terminal device at a same time point when a first location request includes first time information. An execution body of step S301 and step S302 is a management device, a GMLC, an NEF, an AMF, an LMF, or another device that may be configured to obtain the locations of the first terminal device and the second terminal device at the same time point. Alternatively, the execution body may be a chip in the management device, the GMLC, the NEF, the AMF, or the LMF. The method may include but is not limited to the following steps.

Step S301: Send a first location request to a first network device, where the first location request includes first time information, the first time information indicates a first moment, and the first location request is for requesting to obtain locations of the first terminal device and the second terminal device at the first moment.

When the first location request includes the first time information, after receiving the first location request, the first network device obtains the locations of the first terminal device and the second terminal device based on the first moment indicated by the first time information carried in the first location request.

Figure 3B:
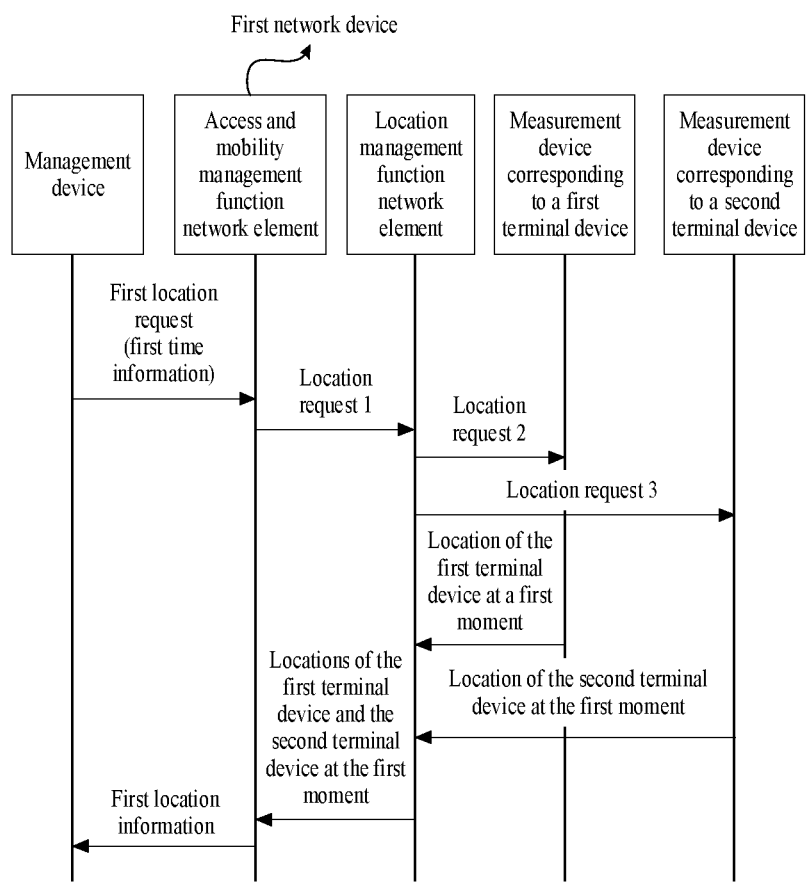
FIG. 3B is a schematic diagram of a scenario in which a first network device obtains locations of a first terminal device and a second terminal device at a first moment according to an embodiment of this disclosure.

In this embodiment of this disclosure, the first network device may be a network device serving the first terminal device and the second terminal device, for example, a GMLC, an NEF, an AMF, or an LMF. For example, the first network device is the AMF. The first network device may obtain the locations of the first terminal device and the second terminal device at the first moment in the following manner. FIG. 3B is a schematic diagram of a scenario thereof. When an LMF corresponding to the first terminal device is the same as an LMF corresponding to the second terminal device, the first network device sends a location request 1 to the LMF, where the location request 1 is for requesting to obtain the locations of the first terminal device and the second terminal device at the first moment. Correspondingly, after receiving the location request 1, the LMF may send a location request 2 to a measurement device corresponding to the first terminal device, and send a location request 3 to a measurement device corresponding to the second terminal device. The location request 2 is for requesting to obtain the location of the first terminal device at the first moment, and the location request 3 is for requesting to obtain the location of the second terminal device at the first moment.

Correspondingly, after receiving the location request 2, the measurement device corresponding to the first terminal device may obtain, through measurement, the location of the first terminal device at the first moment, and feed back the location obtained through measurement to the LMF. Similarly, after receiving the location request 3, the measurement device corresponding to the second terminal device may obtain, through measurement, the location of the second terminal device at the first moment, and feed back the location obtained through measurement to the LMF. After receiving the locations of the first terminal device and the second terminal device at the first moment, the LMF may feed back the received locations to the AMF. Correspondingly, the AMF may include the received locations in the first location information, and feed back the first location information to a management device. The location request 1, the location request 2, and the location request 3 may include the first time information, or may include the first moment. This is not limited in this embodiment of this disclosure.

Figure 3C:
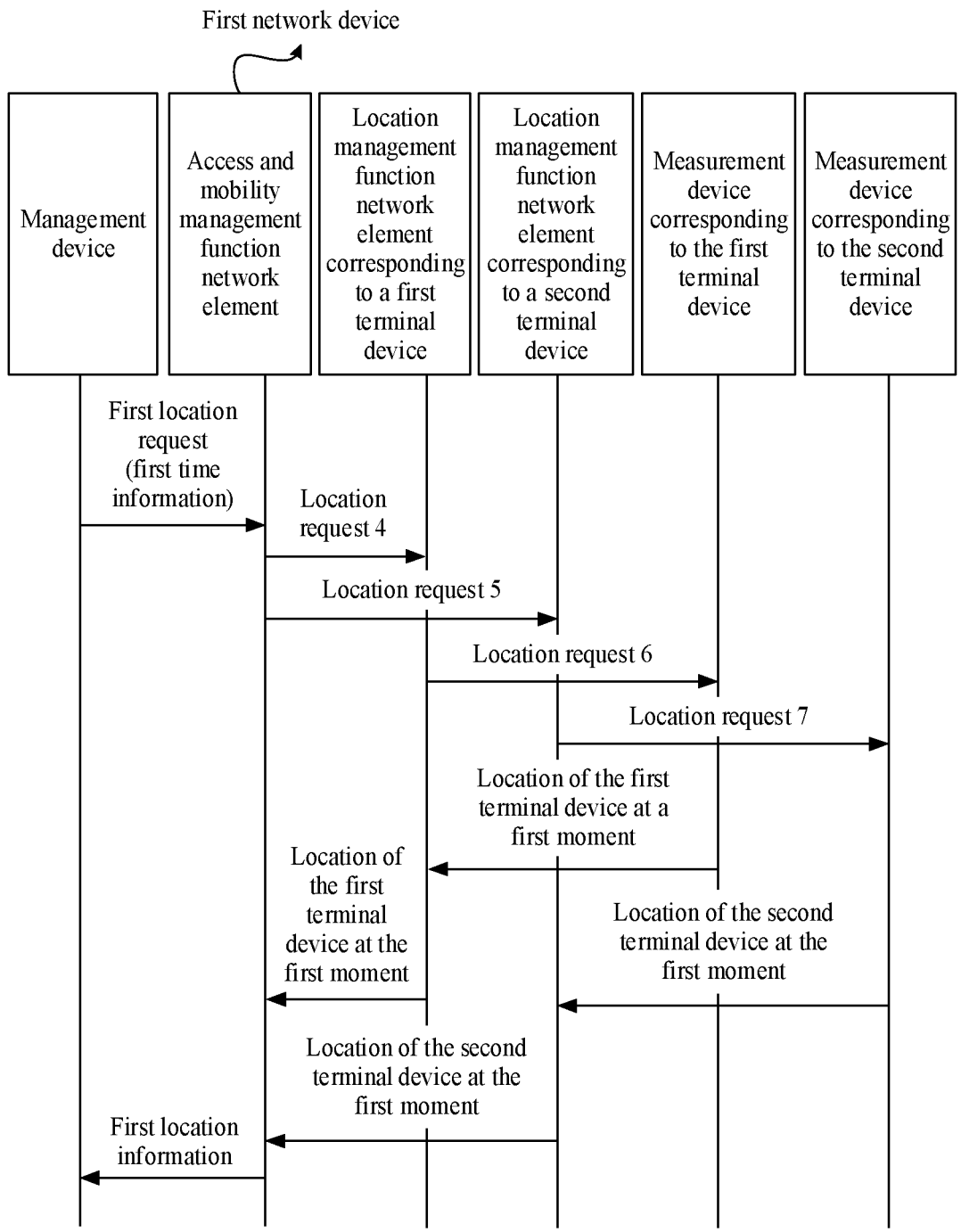
FIG. 3C is a schematic diagram of another scenario in which a first network device obtains locations of a first terminal device and a second terminal device at a first moment according to an embodiment of this disclosure.

In another implementation, for example, the first network device is the AMF. The first network device may obtain the locations of the first terminal device and the second terminal device at the first moment in the following manner. FIG. 3C is a schematic diagram of a scenario thereof. When an LMF corresponding to the first terminal device is different from an LMF corresponding to the second terminal device, the first network device may send a location request 4 to the LMF corresponding to the first terminal device, and send a location request 5 to the LMF corresponding to the second terminal device. The location request 4 is for requesting to obtain the location of the first terminal device at the first moment, and the location request 5 is for requesting to obtain the location of the second terminal device at the first moment. Correspondingly, after receiving the location request 4, the LMF corresponding to the first terminal device may send a location request 6 to a measurement device corresponding to the first terminal device, to request to obtain the location of the first terminal device at the first moment. Similarly, after receiving the location request 5, the LMF corresponding to the second terminal device may send a location request 7 to a measurement device corresponding to the second terminal device, to request to obtain the location of the second terminal device at the first moment. It may be understood that after obtaining a required location, each device (the measurement device, the LMF, or the AMF) may feed back the obtained location to a previous device. For a specific process, refer to FIG. 3B. Details are not described herein again.

It should be noted that, in FIG. 3B and FIG. 3C, an example in which the management device is a sender of the first location request is used, and this does not constitute a limitation on this embodiment of this disclosure. In another embodiment, the sender of the first location request may alternatively be the GMLC, the NEF, or another device. It should be further noted that, in FIG. 3B, that the measurement device corresponding to the first terminal device is different from the measurement device corresponding to the second terminal device is merely used as an example. In another embodiment, the measurement device corresponding to the first terminal device may be the same as the measurement device corresponding to the second terminal device. In this case, the LMF may request the measurement device to obtain the locations of the first terminal device and the second terminal device at the first moment.

It may be understood that if the first network device is the LMF, after receiving the first location request, the first network device may request the measurement device to obtain the locations of the first terminal device and the second terminal device at the first moment. Refer to the foregoing descriptions. When the measurement device corresponding to the first terminal device is the same as the measurement device corresponding to the second terminal device, the LMF may request only the measurement device to obtain the locations of the first terminal device and the second terminal device at the first moment. When the measurement device corresponding to the first terminal device is different from the measurement device corresponding to the second terminal device, the LMF may request the measurement device corresponding to the first terminal device to obtain the location of the first terminal device at the first moment, and request the measurement device corresponding to the second terminal device to obtain the location of the second terminal device at the first moment.

In an implementation, the first network device may be a measurement device that positions the first terminal device and the second terminal device. The measurement device that positions the first terminal device and the second terminal device may be an access network device serving the first terminal device and the second terminal device.

In this embodiment of this disclosure, when the first location request includes the first time information, the first time information may be determined by a device before the first network device in a location request process. For example, core network devices involved in the location request process include the GMLC, the AMF, and the LMF, and the first network device is the AMF. The first time information may be determined by the GMLC or a management device.

In an implementation, the first time information may include the first moment or first duration, and the first duration indicates the first moment. The first moment may be coordinated universal time (UTC). The first duration may be duration from the first moment to a moment 1, and the moment 1 plus the first duration is the first moment. The moment 1 may be a preset moment. Alternatively, the moment 1 may be a punctual moment after the location request is initiated. It should be noted that the moment 1 may be configured by a network (for example, delivered in a system message or dedicated signaling), or agreed in a protocol, or may be set and changed by a user. This is not limited in this embodiment of this disclosure.

In an implementation, the first location request may further include at least one of the following: a time accuracy requirement and second time information. The time accuracy requirement may indicate time accuracy that needs to be satisfied by a time point of positioning the location of the first terminal device and a time point of positioning the location of the second terminal device. The time point of positioning the location of the first terminal device is an actual time point of positioning the location of the first terminal device, and the first moment is an expected time point of positioning the location of the first terminal device.

In an implementation, the time accuracy requirement may include an accuracy time period or accuracy duration. When the time accuracy requirement includes the accuracy duration, that the time point of positioning the location of the first terminal device satisfies the time accuracy may mean that an absolute value of a difference between the time point (namely, the actual time point) of positioning the location of the first terminal device and the first moment (namely, the expected time point) is less than the accuracy duration. When the time accuracy requirement includes the accuracy time period, that the time point of positioning the location of the first terminal device satisfies the time accuracy may mean that the time point of positioning the location of the first terminal device is within the accuracy time period. Both duration between a start moment of the accuracy time period and the first moment and duration between an end moment of the accuracy time period and the first moment are small.

The second time information may indicate that the time point of positioning the location of the first terminal device and the time point of positioning the location of the second terminal device need to be earlier than a second moment. The second moment is a latest location time point that is acceptable. To be specific, the time point (namely, the actual time point) of positioning the location of the terminal device (the first terminal device or the second terminal device) is the second moment at latest. If the time point of positioning the location of the terminal device is earlier than or equal to the second moment, the device (for example, the management device) initiating the location request may accept the location of the terminal device obtained through positioning. If the time point of positioning the location of the terminal device is later than the second moment, the device initiating the location request cannot accept the location of the terminal device obtained through positioning. In this case, the location of the terminal device obtained through positioning may not be fed back to the device initiating the location request. This helps avoid unnecessary resource consumption.

In an implementation, the second time information may include the second moment or include second duration indicating the second moment. The duration may be duration from the second moment to a moment 2, and the moment 2 plus the second duration is the second moment. The moment 2 may be a preset moment. Alternatively, the moment 2 may be a punctual moment after the location request is initiated. It should be noted that the moment 2 may be configured by a network (for example, delivered in a system message or dedicated signaling), or agreed in a protocol, or may be set and changed by a user. This is not limited in this embodiment of this disclosure.

In an implementation, the first location request may further include periodicity time information, and the periodicity time information indicates periodicity duration. In this case, the first location request may be for requesting to periodically obtain the locations of the first terminal device and the second terminal device by using the first moment as a start moment and using the periodicity duration as a time interval.

In an implementation, when the first location request includes the periodicity time information, the second moment may be a moment that is after one or more time intervals after the first moment (namely, the start moment). For example, when the first moment is 2:00:00, and the time interval is 5 minutes, if the second time information indicates the $3^{rd}$ time interval, the second moment may be 2:15:00.

In an implementation, when the first location request includes the periodicity time information, and the time accuracy requirement includes the accuracy duration, that the time point of positioning the location of the first terminal device satisfies the time accuracy in a periodicity may mean that an absolute value of a difference between the time point (namely, the actual time point) of positioning the location of the first terminal device in the periodicity and an expected time point corresponding to the periodicity is less than the accuracy duration. Each periodicity corresponds to an expected time point. For example, when a start time point (namely, the first moment) of the periodicity is 2:00:00, and the time interval is 5 minutes, an expected time point corresponding to the $1^{st}$ periodicity is the first moment, an expected time corresponding to the $2^{nd}$ periodicity is 2:05:00, and an expected time corresponding to the $3^{rd}$ periodicity is 2:10:00. Similarly, in an implementation, when the first location request includes the periodicity time information, each periodicity may correspond to one accuracy time period. That the time point of positioning the location of the first terminal device satisfies the time accuracy in a periodicity may mean that the time point (namely, the actual time point) of positioning the location of the first terminal device in the periodicity is within an accuracy time period corresponding to the periodicity.

Figure 3D:
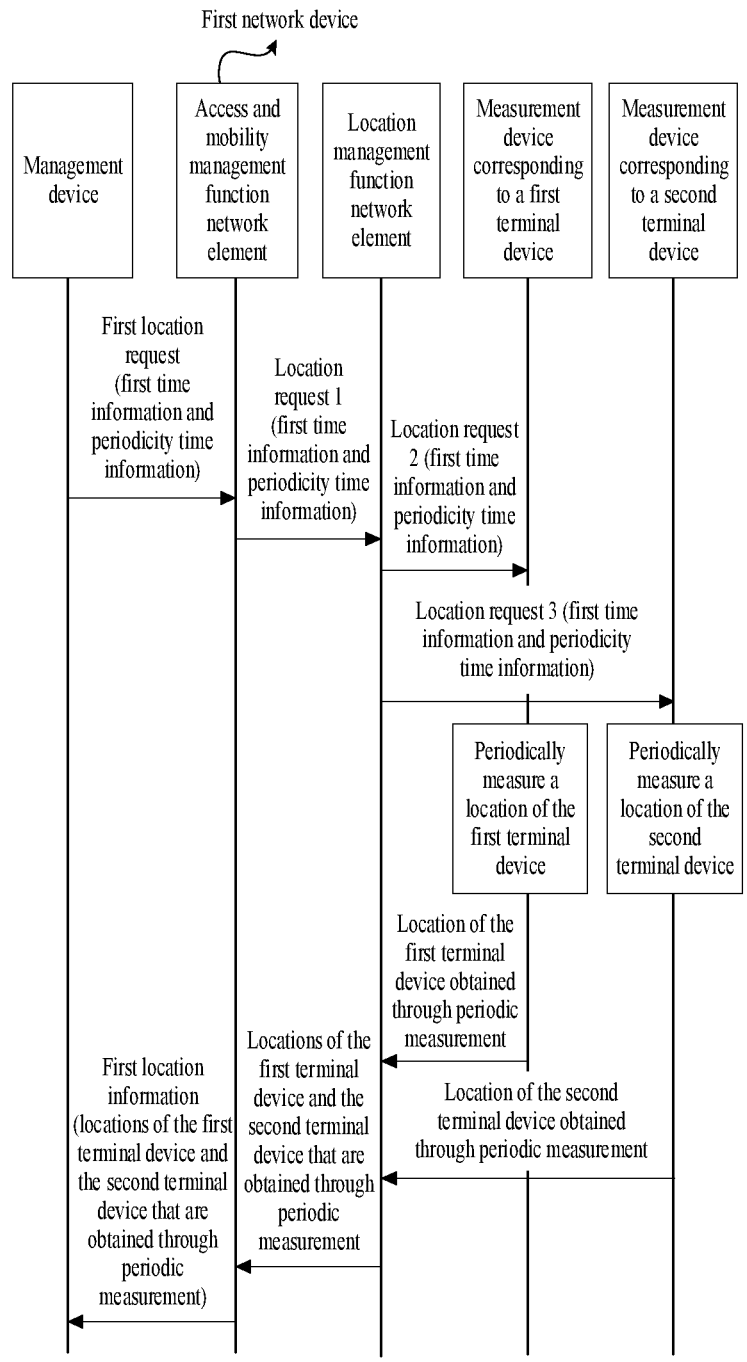
FIG. 3D is a schematic diagram of a periodic location request procedure according to an embodiment of this disclosure.

FIG. 3D is a schematic diagram of a periodic location request procedure. In FIG. 3D, an example in which the first terminal device and the second terminal device correspond to a same AMF and a same LMF is used, but this does not constitute a limitation on this embodiment of this disclosure. In the scenario shown in FIG. 3B, in FIG. 3D, the first location request further includes the periodicity time information. Correspondingly, the location request 1, the location request 2, and the location request 3 also include the periodicity time information. The first location request and the location request 1 are for requesting to periodically obtain the locations of the first terminal device and the second terminal device by using the first moment as a start moment and using the periodicity duration indicated by the periodicity time information as a time interval. The location request 2 is for requesting to periodically obtain the location of the first terminal device by using the first moment as a start moment and using the periodicity duration indicated by the periodicity time information as a time interval. Similarly, the location request 3 is for requesting to periodically obtain the location of the second terminal device by using the first moment as a start moment and using the periodicity duration indicated by the periodicity time information as a time interval.

It should be noted that, in FIG. 3D, that both the location request 2 and the location request 3 include the first time information and the periodicity time information is merely used as an example. In another embodiment, the first time information and the periodicity time information may be separately sent to the measurement device (the measurement device corresponding to the first terminal device or the measurement device corresponding to the second terminal device). For example, the location request 2 includes the first time information, and the periodicity time information is included in a periodicity invocation request 1 and sent by the LMF to the measurement device corresponding to the first terminal device. The location request 2 is for requesting to obtain the location of the first terminal device at the first moment, and the periodicity invocation request 1 is for requesting to periodically obtain the location of the first terminal device by using the first moment as a start moment and using the periodicity duration as a time interval. The periodicity invocation request 1 may include the first time information, or may not include the first time information. For example, because the location request 2 includes the first time information, after receiving the location request 2, the measurement device corresponding to the first terminal device may store the first time information. When the periodicity invocation request 1 is received, it is implicitly determined that the location of the first terminal device is periodically reported based on the first moment indicated by the first time information.

After receiving the location request 2 (including the periodicity time information) or the periodicity invocation request 1 in FIG. 3D, the measurement device corresponding to the first terminal device may feed back a periodicity invocation result 1. The periodicity invocation result 1 may indicate whether the measurement device supports periodically reporting the location of the first terminal device based on the first moment. After receiving the periodicity invocation result 1, the LMF may feed back, to the management device, information indicated by the periodicity invocation result 1 (where this step is not shown in FIG. 3D). If the measurement device corresponding to the first terminal device supports periodically reporting the location of the first terminal device based on the first moment, the measurement device may measure the location of the first terminal device once at an interval of the periodicity duration, and feed back the location obtained through measurement. It should be noted that the location of the first terminal device obtained through periodic measurement may be carried in an event notification and fed back to the management device.

Similarly, the periodicity time information may be included in a periodicity invocation request 2 and sent by the LMF to the measurement device corresponding to the second terminal device. In this case, the location request 3 in FIG. 3D does not include the periodicity time information. The location request 3 is for requesting to obtain the location of the second terminal device at the first moment, and the periodicity invocation request 2 is for requesting to periodically obtain the location of the second terminal device by using the first moment as a start moment and using the periodicity duration as a time interval. After receiving the location request 3 (including the periodicity time information) or the periodicity invocation request 2 in FIG. 3D, the measurement device corresponding to the second terminal device may feed back a periodicity invocation result 2. The periodicity invocation result 2 may indicate whether the measurement device supports periodically reporting the location of the second terminal device based on the first moment. It should be noted that, that the measurement device corresponding to the second terminal device periodically measures the location of the second terminal device is similar to that the measurement device corresponding to the first terminal device periodically measures the location of the first terminal device. A procedure of feeding back the location of the second terminal device obtained through periodic measurement is similar to a procedure of feeding back the location of the first terminal device obtained through periodic measurement. Details are not described herein again. It should be further noted that, in the periodic location request process, the measurement device corresponding to the first terminal device may feed back, to a location requester, a plurality of locations obtained through periodic measurement. Alternatively, the measurement device corresponding to the first terminal device may feed back, each time the measurement device obtains a location through measurement, the location to the location requester. A manner of feeding back location information obtained through periodic measurement is not limited in this embodiment of this disclosure.

It should be noted that, in this embodiment of this disclosure, before the first location request is sent to the first network device, privacy settings of the first terminal device and the second terminal device may be queried. If at least one of the first terminal device and the second terminal device is not allowed to be positioned, subsequent steps are not performed. This embodiment of this disclosure is described on a premise that both the first terminal device and the second terminal device are allowed to be positioned. It should be further noted that an execution body of querying the privacy settings of the first terminal device and the second terminal device may be the GMLC or another device. This is not limited in this embodiment of this disclosure.

Step S302: Receive the first location information from the first network device, where the first location information includes the locations of the first terminal device and the second terminal device at the first moment.

When the first location request does not include the periodicity time information, the first location information may include only the locations of the first terminal device and the second terminal device at the first moment. In an implementation, when the first location request includes the time accuracy requirement, the first location information may further include a time accuracy result. The time accuracy result may indicate whether the locations of the first terminal device and the second terminal device satisfy the time accuracy requirement, in other words, indicate whether the time point of positioning the location of the first terminal device and the time point of positioning the location of the second terminal device satisfy the time accuracy. It should be noted that the time accuracy result may be fed back together with the location of the terminal device. If the terminal device includes the first terminal device, the time accuracy result may indicate whether the location of the first terminal device satisfies the time accuracy requirement. It should be further noted that names of information or messages used in the location request process and the location feedback process are not limited in this embodiment of this disclosure. For example, the time accuracy result may also be referred to as an accuracy satisfaction indication.

When the first location request includes the periodicity time information, the first location information may include locations of the first terminal device and the second terminal device that are periodically obtained by using the first moment as a start moment. When the first location request includes the time accuracy requirement, the first location information may further include a time accuracy result of each periodicity. A time accuracy result of a periodicity may indicate whether a time point of positioning the location of the first terminal device in the periodicity and a time point of positioning the location of the second terminal device in the periodicity satisfy the time accuracy.

In an implementation, if the actually obtained location of the first terminal device and the actually obtained location of the second terminal device are not obtained through measurement at the first moment, the first location information may further include an actual time point of positioning the location of the first terminal device and an actual time point of positioning the location of the second terminal device. In this way, a device that receives the first location information may determine, based on the time accuracy requirement and the actual time point of positioning the location of the first terminal device, whether the actual time point of positioning the location of the first terminal device satisfies the time accuracy, and determine, based on the time accuracy requirement and the actual time point of positioning the location of the second terminal device, whether the actual time point of positioning the location of the second terminal device satisfies the time accuracy.

It should be noted that, that the first location information includes the actual time point of positioning the location of the first terminal device and the actual time point of positioning the location of the second terminal device is merely used as an example. The actual time point of positioning the location of the first terminal device and the actual time point of positioning the location of the second terminal device may be included in other location information. The actual time point of positioning the location of the first terminal device may be fed back together with the location of the first terminal device. Similarly, the actual time point of positioning the location of the second terminal device may be fed back together with the location of the second terminal device.

In this embodiment of this disclosure, because the locations of the first terminal device and the second terminal device are obtained at the same time point, accuracy of calculating a distance between the first terminal device and the second terminal device is improved.

Figure 4A:
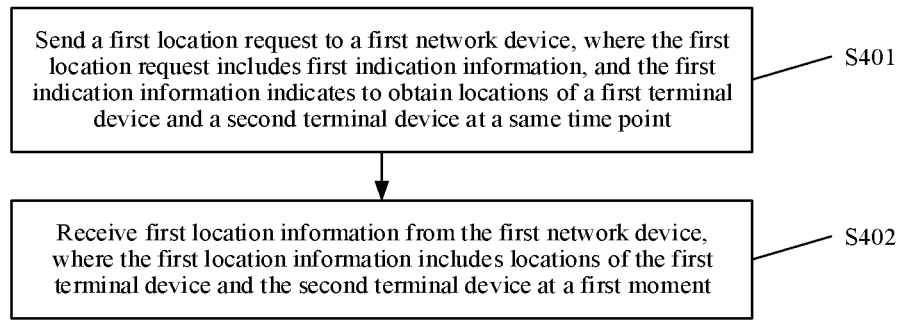
FIG. 4A is a schematic flowchart of still another location obtaining method according to an embodiment of this disclosure.

FIG. 4A is a schematic flowchart of still another location obtaining method according to an embodiment of this disclosure. The method describes in detail how to obtain locations of a first terminal device and a second terminal device at a same time point when a first location request includes first indication information. An execution body of step S401 and step S402 is a management device, a GMLC, an NEF, an AMF, an LMF, or another device that may be configured to obtain the locations of the first terminal device and the second terminal device at the same time point. Alternatively, the execution body may be a chip in the management device, the GMLC, the NEF, the AMF, or the LMF. The method may include but is not limited to the following steps.

Step S401: Send a first location request to a first network device, where the first location request includes first indication information, and the first indication information indicates to obtain locations of a first terminal device and a second terminal device at a same time point.

When the first location request includes the first indication information, the first location request may not indicate a location obtaining moment. After receiving the first location request, the first network device may determine a moment (for example, a first moment), and then obtain the locations of the first terminal device and the second terminal device based on the first moment. It should be noted that, for a process in which after determining the first moment, the first network device obtains the locations of the first terminal device and the second terminal device based on the first moment, refer to a process of obtaining the locations of the first terminal device and the second terminal device based on the first moment when the first location request includes the first time information in FIG. 3A. Details are not described herein again.

In an implementation, the first location request may not include the first indication information, and the first location request may implicitly indicate that the locations of the first terminal device and the second terminal device at the same time point are expected to be obtained. In this case, after receiving the first location request, the first network device also needs to determine the first moment.

It should be noted that when the first location request explicitly indicates (in other words, the first location request includes the first indication information) or implicitly indicates that the locations of the first terminal device and the second terminal device at the same time point are expected to be obtained, that the first moment is determined by the first network device is merely used as an example. The first network device is a network device serving the first terminal device and the second terminal device. In an implementation, if the $1^{st}$ device after the first network device in a location request process serves both the first terminal device and the second terminal device, the first moment may be determined by the $1^{st}$ device. It may be understood that if both the $1^{st}$ device and the $2^{nd}$ device after the first network device can serve both the first terminal device and the second terminal device, the first moment may be determined by the $2^{nd}$ device or the $1^{st}$ device. By analogy, the first moment may be determined by a last device that can serve both the first terminal device and the second terminal device in the location request process, or may be determined by a device before the last device.

Figure 4B:
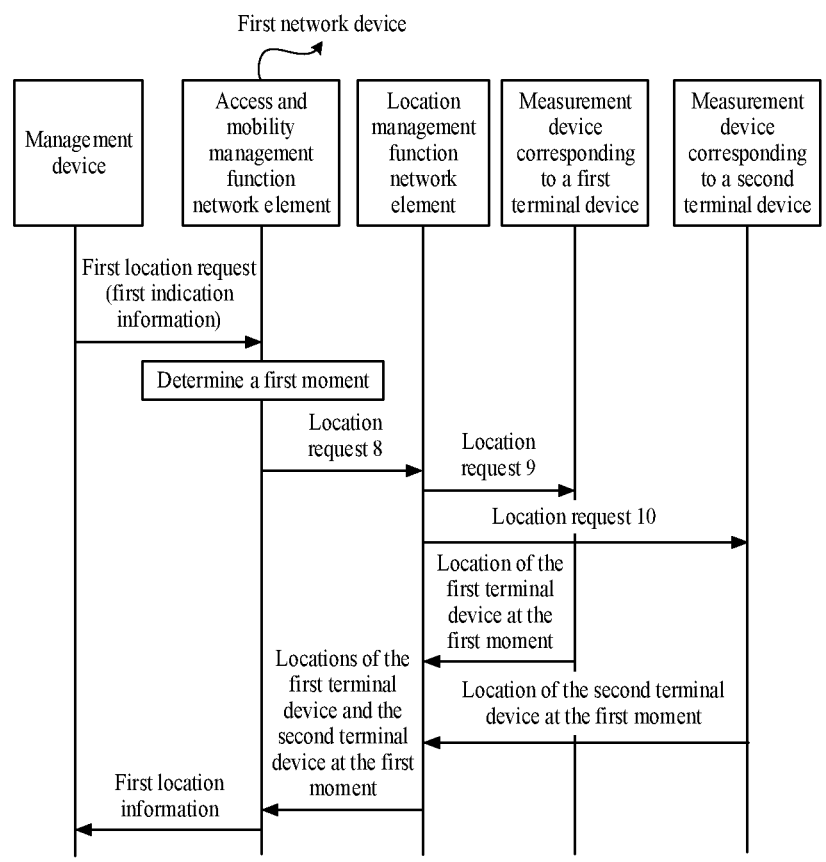
FIG. 4B is a schematic diagram of a scenario in which a first moment is determined by a first network device according to an embodiment of this disclosure.

For example, core network devices involved in the location request process include the GMLC, the AMF, and the LMF, and the first network device is the AMF. The LMF is the $1^{st}$ device after the AMF, and a measurement device is the $2^{nd}$ device after the AMF. If an LMF corresponding to the first terminal device is the same as an LMF corresponding to the second terminal device, and a measurement device corresponding to the first terminal device is different from a measurement device corresponding to the second terminal device, that is, the LMF is the last device that can serve both the first terminal device and the second terminal device in the location request process, the first moment may be determined by the LMF or the AMF. FIG. 4B may be a schematic diagram of a scenario in which the AMF determines the first moment. In FIG. 4B, after determining the first moment, the AMF may send a location request 8 to an LMF corresponding to the first terminal device and the second terminal device, where the location request 8 is for requesting to obtain locations of the first terminal device and the second terminal device at the first moment. Correspondingly, after receiving the location request 8, the LMF may send a location request 9 to the measurement device corresponding to the first terminal device, to request to obtain the location of the first terminal device at the first moment, and send a location request 10 to the measurement device corresponding to the second terminal device, to request to obtain the location of the second terminal device at the first moment. The location request 8, the location request 9, and the location request 10 may include the first moment.

In an implementation, when the first location request does not indicate the location obtaining moment, after receiving the first location request, the first network device may determine third time information, where the third time information may indicate a moment (for example, the first moment). The third time information may include the first moment or duration, and the duration indicates the first moment. In this case, in FIG. 4B, the location request 8, the location request 9, and the location request 10 may include the third time information or the first moment.

It should be noted that the first location request may further include at least one of the following: a time accuracy requirement, second time information, and periodicity time information. For specific descriptions of the time accuracy requirement, the second time information, and the periodicity time information, refer to the embodiment shown in FIG. 3A. Details are not described herein again.

Step S402: Receive first location information from the first network device, where the first location information includes the locations of the first terminal device and the second terminal device at the first moment.

It should be noted that, for a process of performing step S402, refer to the specific descriptions of step S302 in FIG. 3A. Details are not described herein again.

In this embodiment of this disclosure, because the locations of the first terminal device and the second terminal device are obtained at the same time point, accuracy of calculating a distance between the first terminal device and the second terminal device is improved.

Figure 5A:
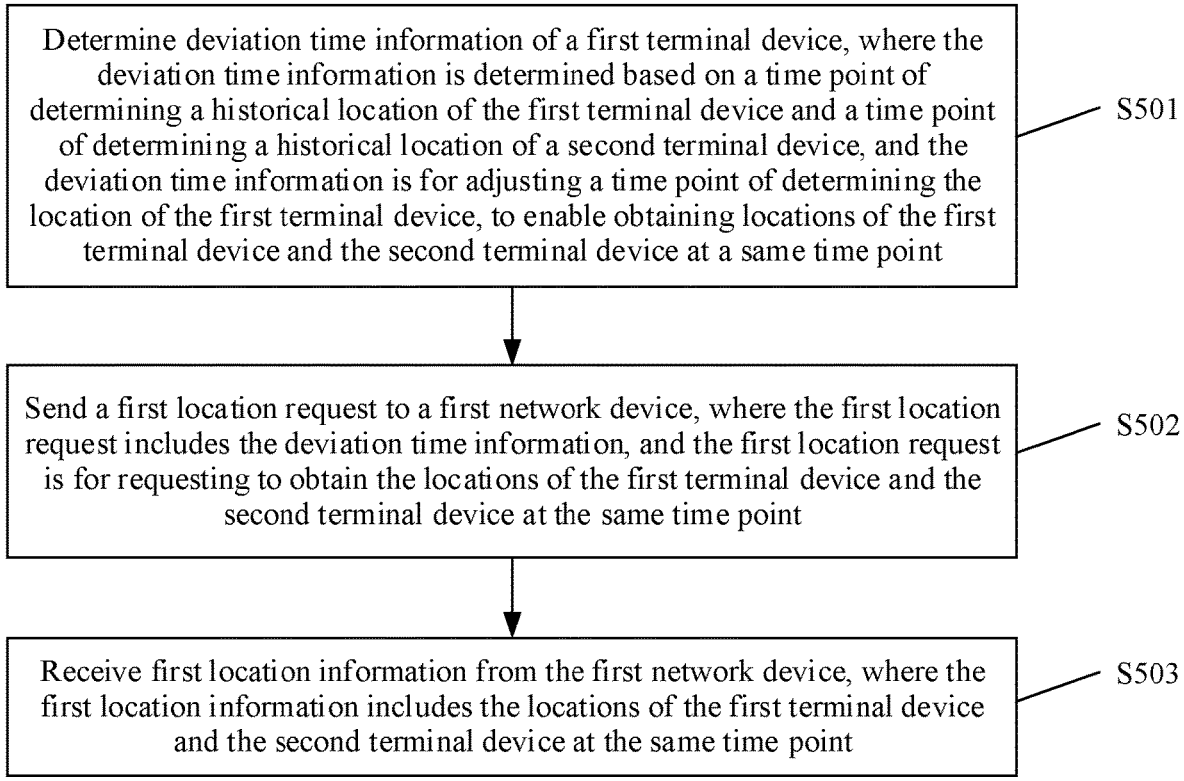
FIG. 5A is a schematic flowchart of still another location obtaining method according to an embodiment of this disclosure.

FIG. 5A is a schematic flowchart of still another location obtaining method according to an embodiment of this disclosure. The method describes in detail how to obtain locations of a first terminal device and a second terminal device at a same time point when a first location request includes deviation time information of the first terminal device. An execution body of step S501 to step S503 is a management device, a GMLC, an NEF, an AMF, an LMF, or another device that may be configured to obtain the locations of the first terminal device and the second terminal device at the same time point. Alternatively, the execution body may be a chip in the management device, the GMLC, the NEF, the AMF, or the LMF. The method may include but is not limited to the following steps.

Step S501: Determine deviation time information of a first terminal device, where the deviation time information is determined based on a time point of positioning a historical location of the first terminal device and a time point of positioning a historical location of a second terminal device, and the deviation time information is for adjusting a time point of positioning the location of the first terminal device, to enable obtaining locations of the first terminal device and the second terminal device at a same time point.

In this embodiment of this disclosure, if the time point of positioning the location of the first terminal device is different from the time point of positioning the location of the second terminal device, the deviation time information of the first terminal device or deviation time information of the second terminal device may be determined, and the time point of positioning the location of the first terminal device or the second terminal device is adjusted by using the deviation time information, to enable obtaining the locations of the first terminal device and the second terminal device at the same time point. It may be understood that the deviation time information of the second terminal device is for adjusting the time point of positioning the location of the second terminal device. In this embodiment of this disclosure, that the deviation time information of the first terminal device is determined is used as an example for description. A time point of positioning one of the first terminal device and the second terminal device is adjusted, so that the locations of the first terminal device and the second terminal device at the same time point may be obtained, and a time point of positioning the locations of the first terminal device and the second terminal device does not need to be adjusted. This helps reduce overheads.

The deviation time information may be determined by a device before a first network device in a location request process. The first network device serves the first terminal device and the second terminal device. For example, core network devices involved in the location request process include the GMLC, the AMF, and the LMF, and the first network device is the AMF. The deviation time information may be determined by the GMLC or a management device. The device may determine the deviation time information in the following manner: determining the deviation time information based on the time point of positioning the historical location of the first terminal device and the time point of positioning the historical location of the second terminal device.

A difference between the time point of positioning the historical location of the second terminal device and the time point of positioning the historical location of the first terminal device may be determined as the deviation time information of the first terminal device. For example, when the time point of positioning the historical location of the first terminal device is 12:00:00, and the time point of positioning the historical location of the second terminal device is 12:02:00, the deviation time information of the first terminal device may be 2 minutes.

In this embodiment of this disclosure, the first terminal device (or the second terminal device) may be positioned at different time points. In other words, there may be a plurality of time points of positioning the historical location of the first terminal device (or the second terminal device). In an implementation, the time point of positioning the historical location of the first terminal device (or the second terminal device) may be a time point of last time positioning the location of the first terminal device (or the second terminal device).

In this embodiment of this disclosure, the deviation time information is for adjusting the time point of positioning the location of the first terminal device, and an adjusted time point of positioning the location of the first terminal device is the same as the time point (which is not adjusted) of positioning the location of the second terminal device. In other words, the locations of the first terminal device and the second terminal device at the same time point may be obtained by adjusting the time point of positioning the location of the first terminal device. After obtaining the deviation time information of the first terminal device, the measurement device may determine, based on the deviation time information and the time point of last time positioning the location of the first terminal device, a time point of this time positioning the location of the first terminal device. For example, if the time point of last time positioning the location of the first terminal device is 12:00:00, a time point of last time positioning the location of the second terminal device is 12:02:00, and the deviation time information of the first terminal device is 2 minutes, the time point of this time positioning the location of the first terminal device may be 12:02:00. If the time point of this time positioning the location of the first terminal device and the time point of last time positioning the location of the second terminal device do not change, the time point of this time positioning the location of the first terminal device may be the same as the time point of last time positioning the location of the second terminal device, that is, the locations of the first terminal device and the second terminal device at the same time point may be obtained.

Step S502: Send a first location request to the first network device, where the first location request includes the deviation time information, and the first location request is for requesting to obtain the locations of the first terminal device and the second terminal device at the same time point.

After the deviation time information of the first terminal device is determined, the first location request that carries the deviation time information may be sent to the first network device. It should be noted that, when the first location request includes the deviation time information of the first terminal device, it may indicate that the time point of positioning the location of the first terminal device needs to be adjusted based on the deviation time information, but the time point of positioning the location of the second terminal device remains unchanged. In this way, the locations of the first terminal device and the second terminal device at the same time point may be obtained. In an implementation, if the deviation time information is determined based on the time point of last time positioning the location of the first terminal device and the time point of last time positioning the location of the second terminal device, that the time point of positioning the location of the second terminal device remains unchanged means keeping the time point of positioning the location of the second terminal device the same as the time point of last time positioning the location of the second terminal device.

In an implementation, in addition to the deviation time information, the first location request may further include periodicity time information (refer to the specific descriptions in the embodiment in FIG. 3A). In this case, the first location request is for requesting to periodically obtain the locations of the first terminal device and the second terminal device at the same time point. In this case, the deviation time information may be for adjusting a start time point of a periodicity of positioning the location of the first terminal device. That the time point of positioning the location of the second terminal device remains unchanged means that a start time point of a periodicity of positioning the location of the second terminal device remains unchanged. It should be noted that, in this embodiment of this disclosure, the periodicity of positioning the first terminal device is the same as the periodicity of positioning the second terminal device. In other words, the first terminal device and the second terminal device are positioned once at a same interval of duration.

Step S503: Receive first location information from the first network device, where the first location information includes the locations of the first terminal device and the second terminal device at the same time point.

In this embodiment of this disclosure, after receiving the first location request, the first network device may request a measurement device corresponding to the first terminal device to adjust, based on the deviation time information, the time point of positioning the location of the first terminal device, and feed back the location of the first terminal device. It should be noted that the location of the first terminal device fed back by the measurement device corresponding to the first terminal device and the location of the second terminal device fed back by a measurement device corresponding to the second terminal device are obtained through measurement at the same time point (where an example in which the time point is a first moment is used for description below).

Before receiving the first location request, the first network device may request the measurement device corresponding to the second terminal device to position a location of the second terminal device at the first moment. In other words, a process of requesting to obtain a location of the first terminal device at the first moment may be independent of a process of requesting to obtain the location of the second terminal device at the first moment. For example, before receiving the first location request, the first network device requests the measurement device corresponding to the second terminal device to periodically feed back the location of the second terminal device by using the first moment as a start moment. For a procedure of requesting to obtain the location of the second terminal device at the first moment, refer to the specific descriptions in embodiments in FIG. 2 to FIG. 4A. It should be noted that, in the procedure of requesting to obtain the location of the second terminal device at the first moment, a sent location request may not carry the first time information or the first moment. The location request may implicitly indicate the measurement device corresponding to the second terminal device to obtain the location of the second terminal device based on the time point (namely, the first moment) of last time positioning the location of the second terminal device. In this manner, the location of the second terminal device at the first moment may be obtained. It should be further noted that the first network device may directly initiate the foregoing request to a measurement device (the measurement device corresponding to the first terminal device or the measurement device corresponding to the second terminal device), or may initiate the foregoing request to the measurement device by using another intermediate device.

Figure 5B:
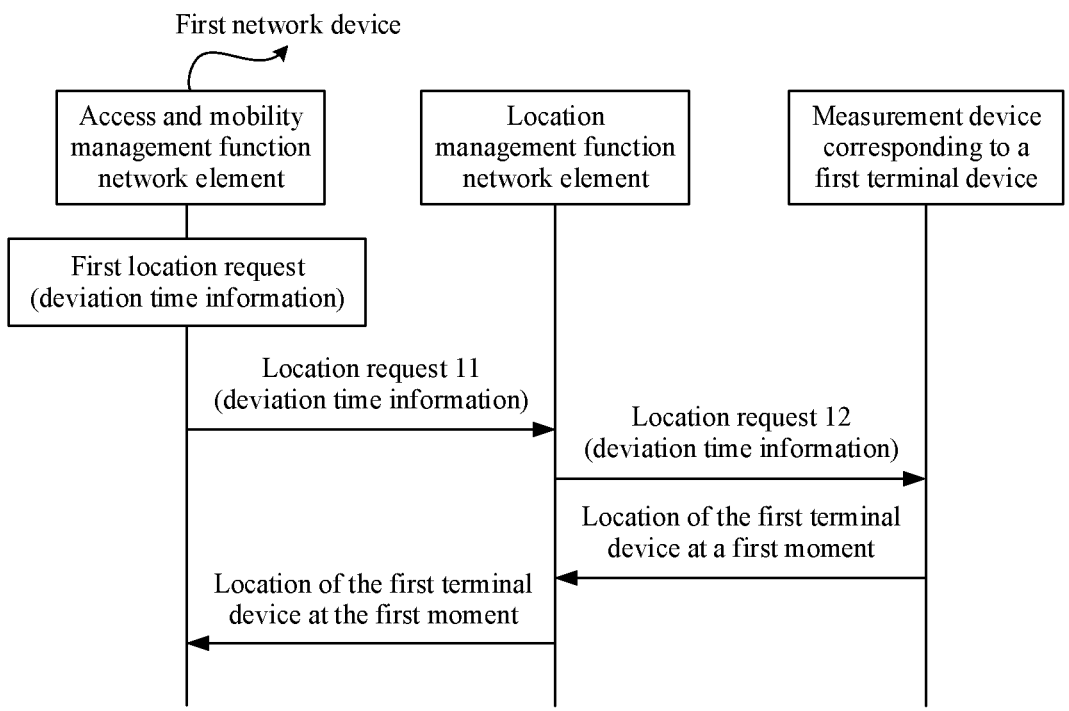
FIG. 5B is a schematic flowchart of requesting to obtain a location of a first terminal device at a first moment according to an embodiment of this disclosure.

For example, the first network device is an AMF. FIG. 5B may be a schematic flowchart of requesting to obtain the location of the first terminal device at the first moment. After receiving the first location request that carries the deviation time information of the first terminal device, the first network device may send a location request 11 to an LMF, where the location request 11 is for requesting to obtain the location of the first terminal device at the first moment. Correspondingly, after receiving the location request 11, the LMF may send a location request 12 to the measurement device corresponding to the first terminal device. The location request 11 and the location request 12 both carry the deviation time information. The location request 12 is for requesting to adjust, based on the deviation time information, the time point of positioning the location of the first terminal device, and obtain the location of the first terminal device based on an adjusted time point. The adjusted time point is the first moment. It may be understood that after obtaining a required location, each device (the measurement device, the LMF, or the AMF) may feed back the obtained location to a previous device. For a specific process, refer to FIG. 3B. Details are not described herein again.

It should be noted that, that the location request 12 in FIG. 5B carries the deviation time information is merely an example. In an implementation, if the LMF knows the time point of last time positioning the location of the first terminal device, the LMF may adjust, based on the time point of last time positioning the location of the first terminal device and the deviation time information, the time point of positioning the location of the first terminal device. The adjusted time point is the first moment. In this case, the location request 12 may carry the first moment.

It should be noted that, for a remaining process of performing step S503, refer to the specific descriptions of step S202 in FIG. 2. Details are not described herein again.

In this embodiment of this disclosure, the first location request carries the deviation time information of the first terminal device, so that the time point of positioning the location of the first terminal device can be adjusted, and the locations of the first terminal device and the second terminal device at the same time point can be obtained, thereby improving accuracy of calculating a distance between the first terminal device and the second terminal device.

Figure 6:
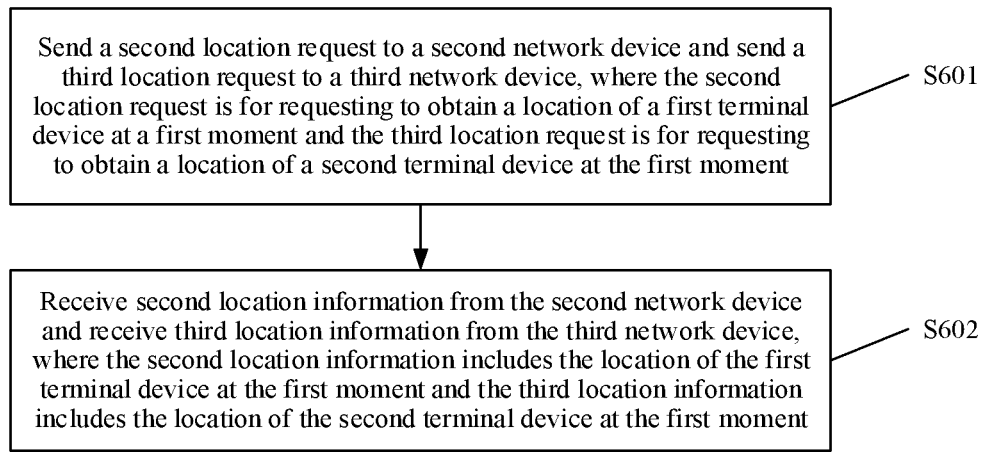
FIG. 6 is a schematic flowchart of still another location obtaining method according to an embodiment of this disclosure.

FIG. 6 is a schematic flowchart of still another location obtaining method according to an embodiment of this disclosure. The method describes in detail how to separately send a request to a network device corresponding to a first terminal device and a network device corresponding to a second terminal device, to request to obtain locations of the first terminal device and the second terminal device at a same time point. An execution body of step S601 and step S602 is a management device, a GMLC, an NEF, an AMF, an LMF, or another device that may be configured to obtain the locations of the first terminal device and the second terminal device at the same time point. Alternatively, the execution body may be a chip in the management device, the GMLC, the NEF, the AMF, or the LMF. The method may include but is not limited to the following steps.

Step S601: Send a second location request to a second network device and send a third location request to a third network device, where the second location request is for requesting to obtain a location of a first terminal device at a first moment and the third location request is for requesting to obtain a location of a second terminal device at the first moment.

When the first terminal device and the second terminal device correspond to different network devices, a network device corresponding to the first terminal device may be requested to obtain the location of the first terminal device at the first moment, and a network device corresponding to the second terminal device is requested to obtain the location of the second terminal device at the first moment. That the network device corresponding to the first terminal device is requested to obtain the location of the first terminal device at the first moment may mean that the second network device corresponding to the first terminal device is requested to obtain the location of the first terminal device at the first moment. The second network device may be configured to obtain a location of the first terminal device at a specified moment (for example, the first moment).

In an implementation, the second network device may be a network device serving the first terminal device; a first measurement device that positions the first terminal device; the first terminal device; or an access network device serving the first terminal device. Similarly, the third network device may be a network device serving the second terminal device; a second measurement device that positions the second terminal device; the second terminal device; or an access network device serving the second terminal device. In this embodiment of this disclosure, the access network device may be an evolved NodeB (eNB), a next-generation NodeB (gNB) in an NR system, a base station in another future mobile communication system, or the like. A specific technology and a specific device form used for the access network device are not limited in this embodiment of this disclosure.

In an implementation, before the second location request is sent, the second network device that supports obtaining the location of the first terminal device at the first moment may be further determined from a plurality of network devices, and the third network device that supports obtaining the location of the second terminal device at the first moment may be determined from a plurality of network devices. For example, an execution body of sending the second location request is an AMF, and the second network device is an LMF. There may be a plurality of LMFs in a network corresponding to the first terminal device. A part of the LMFs support obtaining a location of the first terminal device at a specified moment (for example, the first moment), and the other part of the LMFs does not support obtaining the location of the first terminal device at the specified moment (for example, the first moment). In this case, the AMF may determine, from the plurality of LMFs, an LMF supporting obtaining the location of the first terminal device at the first moment, and send the second location request to the LMF.

When the location request is separately sent to the network corresponding to the first terminal device and the network corresponding to the second terminal device, the time point that is determined by the first measurement device after the first measurement device receives the second location request and that is for positioning the first terminal device needs to be the same as the time point that is determined by the second measurement device after the second measurement device receives the third location request and that is for positioning the second terminal device, to obtain the locations of the first terminal device and the second terminal device at the same time point. In other words, the first measurement device and the second measurement device may determine a same moment (for example, the first moment) by using the second location request and the third location request.

A manner in which the first measurement device and the second measurement device determine the first moment by using the second location request and the third location request may include but is not limited to the following two manners.

First manner: Both the second location request and the third location request include first time information, and the first time information indicates the first moment. The first time information may include the first moment or first duration, and the first duration indicates the first moment. For related content of the first time information, refer to the specific descriptions in the embodiment in FIG. 3A. Details are not described herein again.

Second manner: The second location request includes deviation time information of the first terminal device, where the deviation time information enables adjusting the time point of positioning the location of the first terminal device to the first moment, and the deviation time information is determined based on a time point of positioning a historical location of the first terminal device and a time point of positioning a historical location of the second terminal device. The third location request is for requesting to obtain the location of the second terminal device at the first moment. A time point of positioning one of the first terminal device and the second terminal device (the first terminal device is used as an example) is adjusted, so that the locations of the first terminal device and the second terminal device at the same time point (the first moment) may be obtained, and a time point of positioning the locations of the first terminal device and the second terminal device does not need to be adjusted. This helps reduce overheads.

For related content of the deviation time information of the first terminal device, refer to the specific descriptions in the embodiment in FIG. 5A. Details are not described herein again. It should be noted that when the second location request includes the deviation time information of the first terminal device, the third location request may implicitly indicate to request to obtain the location of the second terminal device at the first moment. For example, when the time point of positioning the historical location of the second terminal device is the first moment, the third location request may indicate to obtain the location of the second terminal device based on the time point (namely, the first moment) of positioning the historical location of the second terminal device. It should be further noted that, that the second location request includes the deviation time information of the first terminal device is merely an example. In another embodiment, the third location request may alternatively include deviation time information of the second terminal device. It should be further noted that, for related content of a device of determining the deviation time information of the first terminal device, refer to the specific descriptions in the embodiment in FIG. 5A. Details are not described herein again.

In an implementation, the second location request and the third location request may include at least one of the following: a time accuracy requirement, second time information, and periodicity time information. It should be noted that if the second location request includes the time accuracy requirement, the third location request also includes the time accuracy requirement. If the second location request includes the second time information, the third location request also includes the second time information. If the second location request includes the periodicity time information, the third location request also includes the periodicity time information. For specific descriptions of the time accuracy requirement, the second time information, and the periodicity time information, refer to the embodiment shown in FIG. 3A. Details are not described herein again.

Step S602: Receive second location information from the second network device and receive third location information from the third network device, where the second location information includes the location of the first terminal device at the first moment and the third location information includes the location of the second terminal device at the first moment.

After receiving the second location request, the second network device may request the first measurement device to obtain the location of the first terminal device at the first moment. Similarly, after receiving the third location request, the third network device may request the second measurement device to obtain the location of the second terminal device at the first moment. For how the measurement device obtains the location of the terminal device at the specified moment (for example, the first moment), refer to the specific descriptions in embodiments in FIG. 2 to FIG. 5A. Details are not described herein again.

After obtaining the location of the first terminal device at the first moment, the second network device may feed back the second location information to a sender of the second location request. Similarly, after obtaining the location of the second terminal device at the first moment, the third network device may feed back the third location information to a sender of the third location request.

In an implementation, when the second location request includes the time accuracy requirement, the second location information may further include a time accuracy result of each periodicity. Similarly, when the third location request includes the time accuracy requirement, the third location information may further include a time accuracy result of each periodicity.

It should be noted that an execution process in which the second network device obtains the location of the first terminal device at the first moment is basically the same as an execution process in which the first network device obtains the location of the first terminal device at the first moment in embodiments in FIG. 3A and FIG. 5A.

In this embodiment of this disclosure, because the locations of the first terminal device and the second terminal device are both obtained at the first moment, accuracy of calculating a distance between the first terminal device and the second terminal device is improved.

In an implementation, after requesting, from the network, to obtain the location of the first terminal device at the first moment, the management device (or the GMLC or the NEF) may receive second indication information from the network, where the second indication information may indicate that the location of the first terminal device at the first moment cannot be obtained. In an implementation, when the second indication information indicates that the location of the first terminal device at the first moment cannot be obtained, the second indication information may further indicate a reason why the location of the first terminal device at the first moment cannot be obtained, where the reason may be indicated by using a cause value. The reason why the location of the first terminal device at the first moment cannot be obtained may be that the first terminal device is unreachable at the first moment.

In another implementation, the second indication information may indicate that the location of the first terminal device at the first moment cannot be obtained, and a location of the first terminal device at a third moment can be obtained. The third moment is later than the first moment. If the management device (or the GMLC or the NEF) can accept the location of the first terminal device at the third moment, the management device may wait for the network to feed back the location of the first terminal device at the third moment. In this case, the third moment is earlier than the second moment.

In an implementation, the third moment may be a moment of the first moment plus N time intervals. The time interval is duration of an interval between two adjacent time points of obtaining the location of the first terminal device when the location of the first terminal device is periodically obtained. N may be an integer greater than or equal to 1.

In still another implementation, the second indication information may indicate that the location of the first terminal device cannot be obtained before the second moment. In other words, the location of the first terminal device cannot be obtained at an acceptable time point.

It should be noted that, that the second indication information indicates whether a location of the first terminal device at a moment (for example, the first moment, the second moment, or the third moment) can be obtained is merely used as an example. The second indication information may alternatively indicate whether a location of the second terminal device at a moment (for example, the first moment, the second moment, or the third moment) can be obtained.

In the foregoing embodiments provided in this disclosure, the method provided in embodiments of this disclosure is described from a perspective of different devices. To implement the functions in the foregoing method provided in embodiments of this disclosure, the communication apparatus in embodiments of this disclosure may include a hardware structure and a software module, to implement the functions in a form of the hardware structure, the software module, or a combination of the hardware structure and the software module. One of the foregoing functions may be performed by using the hardware structure, the software module, or the combination of the hardware structure and the software module.

Figure 7:
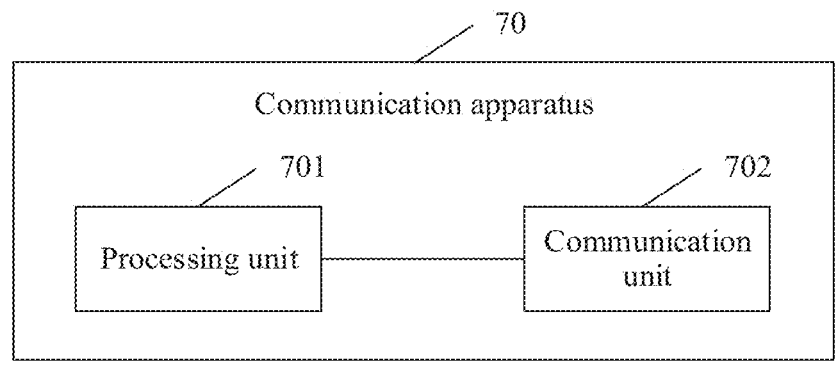
FIG. 7 is a schematic diagram of a structure of a communication apparatus according to an embodiment of this disclosure.

FIG. 7 is a schematic diagram of a structure of a communication apparatus 70 according to an embodiment of this disclosure. The communication apparatus 70 shown in FIG. 7 may include a processing unit 701 and a communication unit 702. The communication unit 702 may include a sending unit and a receiving unit. The sending unit is configured to implement a sending function, the receiving unit is configured to implement a receiving function, and the communication unit 702 may implement the sending function and the receiving function. The communication unit may also be described as a transceiver unit.

The communication apparatus 70 may be a device configured to perform step S201 and step S202, step S301 and step S302, step S401 and step S402, step S501 to step S503, or step S601 and step S602, may be an apparatus in the device, or may be an apparatus that can be used in combination with the device. Alternatively, the communication apparatus 70 may be a first network device, may be an apparatus in the first network device, or may be an apparatus that can be used in combination with the first network device. Alternatively, the communication apparatus 70 may be a second network device, may be an apparatus in the second network device, or may be an apparatus that can be used in combination with the second network device. Alternatively, the communication apparatus 70 may be a third network device, may be an apparatus in the third network device, or may be an apparatus that can be used in combination with the third network device.

The communication apparatus 70 is a device configured to perform step S201 and step S202, step S301 and step S302, step S401 and step S402, step S501 to step S503, or step S601 and step S602. The processing unit 701 is configured to invoke the communication unit 702 to request, from a network, to obtain locations of a first terminal device and a second terminal device at a same time point; and further configured to invoke the communication unit 702 to receive, from the network, the locations of the first terminal device and the second terminal device at the same time point.

In an implementation, the processing unit 701 may be further configured to invoke the communication unit 702 to send a first location request to a first network device, where the first network device serves the first terminal device and the second terminal device, and the first location request is for requesting to obtain the locations of the first terminal device and the second terminal device at the same time point; and the processing unit 701 may be further configured to invoke the communication unit 702 to receive first location information from the first network device, where the first location information includes the locations of the first terminal device and the second terminal device at the same time point.

In an implementation, the first location request includes first time information, and the first time information indicates a first moment. The first location request is for requesting to obtain locations of the first terminal device and the second terminal device at the first moment.

In an implementation, the first time information includes the first moment or first duration, and the first duration indicates the first moment.

In an implementation, the first location request includes first indication information, and the first indication information indicates to obtain the locations of the first terminal device and the second terminal device at the same time point.

In an implementation, the processing unit 701 may be further configured to determine deviation time information of the first terminal device, where the deviation time information is determined based on a time point of positioning a historical location of the first terminal device and a time point of positioning a historical location of the second terminal device. The first location request may include the deviation time information, and the deviation time information is for adjusting a time point of positioning the location of the first terminal device, to enable obtaining the locations of the first terminal device and the second terminal device at the same time point.

In an implementation, the first location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the first location information further includes a time accuracy result, and the time accuracy result indicates whether the locations of the first terminal device and the second terminal device satisfy the time accuracy requirement.

In an implementation, the processing unit 701 may be further configured to invoke the communication unit 702 to send a second location request to a second network device, and send a third location request to a third network device, where the second location request is for requesting to obtain a location of the first terminal device at a first moment, and the third location request is for requesting to obtain a location of the second terminal device at the first moment. The processing unit 701 may be further configured to invoke the communication unit 702 to receive second location information from the second network device, and receive third location information from the third network device, where the second location information includes the location of the first terminal device at the first moment, and the third location information includes the location of the second terminal device at the first moment.

In an implementation, both the second location request and the third location request include first time information, and the first time information indicates the first moment.

In an implementation, the first time information includes the first moment or first duration, and the first duration indicates the first moment.

In an implementation, the processing unit 701 may be further configured to determine deviation time information of the first terminal device, where the deviation time information is determined based on a time point of positioning a historical location of the first terminal device and a time point of positioning a historical location of the second terminal device. The second location request may include the deviation time information, and the deviation time information enables adjusting a time point of positioning the location of the first terminal device to the first moment.

In an implementation, the second location request and the third location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the second location information may further include a time accuracy result, and the time accuracy result indicates whether the location of the first terminal device satisfies the time accuracy requirement.

In an implementation, the second network device may be a network device serving the first terminal device; a first measurement device that positions the first terminal device; the first terminal device; or an access network device serving the first terminal device.

The communication apparatus 70 is a first network device. The processing unit 701 is configured to invoke the communication unit 702 to receive a first location request, where the first location request is for requesting to obtain locations of a first terminal device and a second terminal device at a same time point, and the communication apparatus 70 serves the first terminal device and the second terminal device. The processing unit 701 is further configured to invoke the communication unit 702 to send first location information, where the first location information includes location information of the first terminal device and the second terminal device at the same time point.

In an implementation, the first location request includes first time information, and the first time information indicates a first moment. The first location request is for requesting to obtain locations of the first terminal device and the second terminal device at the first moment.

In an implementation, the first time information includes the first moment or first duration, and the first duration indicates the first moment.

In an implementation, the first location request includes first indication information, and the first indication information indicates to obtain the locations of the first terminal device and the second terminal device at the same time point. The processing unit 701 may be further configured to determine a first moment, and obtain locations of the first terminal device and the second terminal device at the first moment.

In an implementation, the first location request may include deviation time information of the first terminal device, and the deviation time information is determined based on a time point of positioning a historical location of the first terminal device and a time point of positioning a historical location of the second terminal device. The deviation time information is for adjusting a time point of positioning the location of the first terminal device, to enable obtaining the locations of the first terminal device and the second terminal device at the same time point.

In an implementation, the first location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the first location information further includes a time accuracy result, and the time accuracy result indicates whether the locations of the first terminal device and the second terminal device satisfy the time accuracy requirement.

The communication apparatus 70 is a second network device. The processing unit 701 is configured to invoke the communication unit 702 to receive a second location request, where the second location request is for requesting to obtain a location of a first terminal device at a first moment; and the processing unit 701 is further configured to invoke the communication unit 702 to send second location information, where the second location information includes the location of the first terminal device at the first moment.

In an implementation, the second location request includes first time information, and the first time information indicates the first moment.

In an implementation, the first time information includes the first moment or first duration, and the first duration indicates the first moment.

In an implementation, the second location request may include deviation time information of the first terminal device, and the deviation time information is determined based on a time point of positioning a historical location of the first terminal device and a time point of positioning a historical location of a second terminal device. The deviation time information enables adjusting a time point of positioning the location of the first terminal device to the first moment.

In an implementation, the second location request may include at least one of the following: a time accuracy requirement, where the time accuracy requirement indicates time accuracy that needs to be satisfied by the time point of positioning the location of the first terminal device; and second time information, where the second time information indicates that the time point of positioning the location of the first terminal device needs to be earlier than a second moment.

In an implementation, the first location information further includes a time accuracy result, and the time accuracy result indicates whether the location of the first terminal device satisfies the time accuracy requirement.

Figure 8:
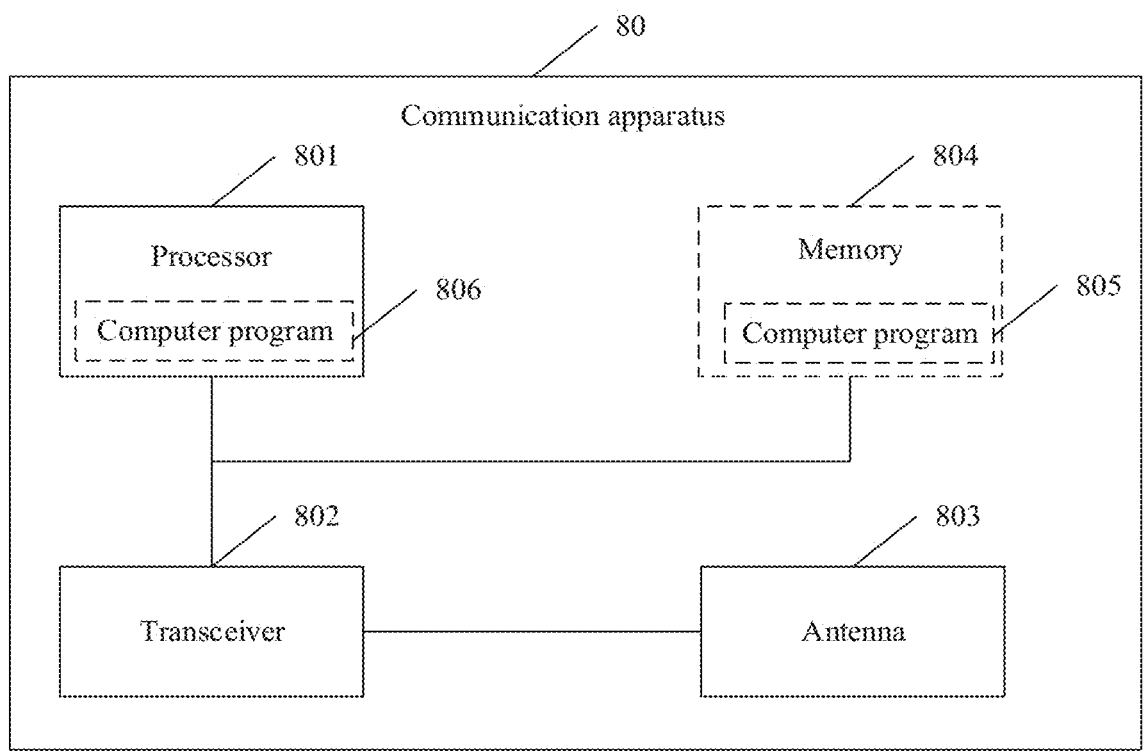
FIG. 8 is a schematic diagram of a structure of another communication apparatus according to an embodiment of this disclosure.

FIG. 8 is a schematic diagram of a structure of another communication apparatus 80 according to an embodiment of this disclosure. The communication apparatus 80 may be a device configured to perform step S201 and step S202, step S301 and step S302, step S401 and step S402, step S501 to step S503, or step S601 and step S602, or may be a chip, a chip system, a processor, or the like that supports the device in implementing the foregoing methods. Alternatively, the communication apparatus 80 may be a first network device, or may be a chip, a chip system, a processor, or the like that supports the first network device in implementing the foregoing methods. Alternatively, the communication apparatus 80 may be a second network device, or may be a chip, a chip system, a processor, or the like that supports the second network device in implementing the foregoing methods. Alternatively, the communication apparatus 80 may be a third network device, or may be a chip, a chip system, a processor, or the like that supports the third network device in implementing the foregoing methods. The apparatus may be configured to implement the methods described in the foregoing method embodiments. For details, refer to the descriptions in the foregoing method embodiments.

The communication apparatus 80 may include one or more processors 801. The processor 801 may be a general-purpose processor, a dedicated processor, or the like. For example, the processor 801 may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU) to execute a computer program, to process data of the computer program.

The communication apparatus 80 may further include a transceiver 802 and an antenna 803. The transceiver 802 may be referred to as a transceiver unit, a transceiver, a transceiver circuit, or the like, and is configured to implement a transceiver function. The antenna 803 may include a receiver and a transmitter. The receiver may be referred to as a receiver circuit or the like, and is configured to implement a receiving function. The transmitter may be referred to as a transmitter circuit or the like, and is configured to implement a sending function.

Optionally, the communication apparatus 80 may include one or more memories 804, and the memory 804 may store a computer program 805. The computer program may be run on the communication apparatus 80, to enable the communication apparatus 80 to perform the methods described in the foregoing method embodiments. Optionally, the memory 804 may further store data. The communication apparatus 80 and the memory 804 may be separately disposed, or may be integrated.

The processor 801 in the communication apparatus 80 is configured to perform step S201 and step S202, step S301 and step S302, step S401 and step S402, step S501 to step S503, or step S601 and step S602.

Alternatively, the communication apparatus 80 is a first network device. In embodiments shown in FIG. 2 to FIG. 5A, the processor 801 is configured to invoke the transceiver 802 to receive a first location request and send first location information. The processor 801 may be further configured to determine a first moment, and obtain locations of a first terminal device and a second terminal device at the first moment.

Alternatively, the communication apparatus 80 is a second network device. In the embodiment shown in FIG. 6, the processor 801 is configured to invoke the transceiver 802 to receive a second location request and send second location information.

Alternatively, the communication apparatus 80 is a third network device. In the embodiment shown in FIG. 6, the processor 801 is configured to invoke the transceiver 802 to receive a third location request and send third location information.

In an implementation, the processor 801 may include a transceiver configured to implement a receiving function and a sending function. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In an implementation, the processor 801 may store a computer program 806. The computer program 806 is run on the processor 801, to enable the communication apparatus 80 to perform the methods described in the foregoing method embodiments. The computer program 806 may be fixed in the processor 801. In this case, the processor 801 may be implemented by hardware.

In an implementation, the communication apparatus 80 may include a circuit, and the circuit may implement a sending, receiving, or communication function in the foregoing method embodiments. The processor and the transceiver that are described in this disclosure may be implemented on an integrated circuit (IC), an analog IC, a radio frequency IC (RFIC), a mixed-signal IC, an application-specific integrated circuit (ASIC), a printed circuit board (PCB), an electronic device, or the like. The processor and the transceiver may alternatively be manufactured by using various IC technologies, for example, a complementary metal-oxide-semiconductor (CMOS), an N-type metal oxide semiconductor (NMOS), a P-channel metal oxide semiconductor (PMOS), a bipolar junction transistor (BJT), a bipolar CMOS (BiCMOS), silicon germanium (SiGe), and gallium arsenide (GaAs).

The communication apparatus described in the foregoing embodiment may be a device configured to perform step S201 and step S202, step S301 and step S302, step S401 and step S402, step S501 to step S503, or step S601 and step S602, or may be a first network device, a second network device, or a third network device. However, a scope of the communication apparatus described in this disclosure is not limited thereto, and a structure of the communication apparatus may not be limited by FIG. 8. The communication apparatus may be an independent device or may be a part of a large device. For example, the communication apparatus may be:

(1) an independent IC, a chip, or a chip system or subsystem;
(2) a set including one or more ICs, where optionally, the set of ICs may further include a storage component configured to store data and a computer program;
(3) an ASIC such as a modem;
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

Figure 9:
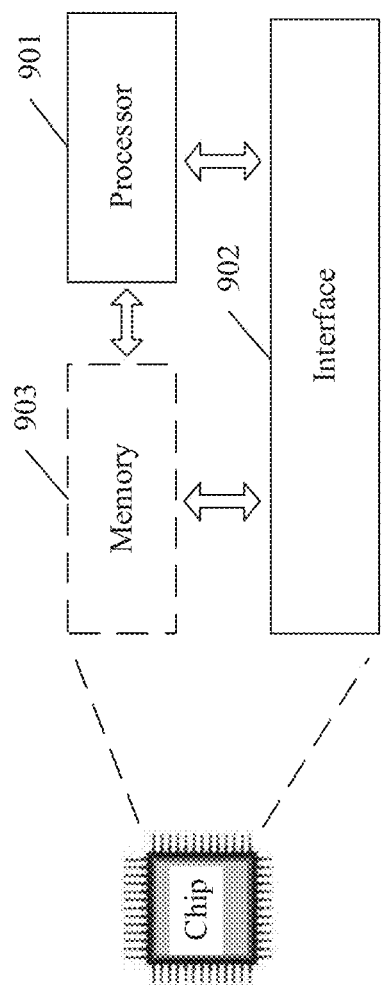
FIG. 9 is a schematic diagram of a structure of a chip according to an embodiment of this disclosure.

For a case in which the communication apparatus may be a chip or a chip system, refer to a schematic diagram of a structure of a chip shown in FIG. 9. The chip shown in FIG. 9 includes a processor 901 and an interface 902. There may be one or more processors 901 and a plurality of interfaces 902.

When the chip is configured to implement functions of step S201 and step S202, step S301 and step S302, step S401 and step S402, step S501 to step S503, or step S601 and step S602 in embodiments of this disclosure.

The processor 901 is configured to invoke the interface 902 to request, from a network, to obtain locations of a first terminal device and a second terminal device at a same time point; and is further configured to invoke the interface 902 to receive, from the network, the locations of the first terminal device and the second terminal device at the same time point.

In an implementation, the processor 901 may be further configured to invoke the interface 902 to send a first location request to a first network device, where the first network device serves the first terminal device and the second terminal device, and the first location request is for requesting to obtain the locations of the first terminal device and the second terminal device at the same time point; and the processor 901 may be further configured to invoke the interface 902 to receive first location information from the first network device, where the first location information includes the locations of the first terminal device and the second terminal device at the same time point.

In an implementation, the first location request includes first time information, and the first time information indicates a first moment. The first location request is for requesting to obtain locations of the first terminal device and the second terminal device at the first moment.

In an implementation, the first time information includes the first moment or first duration, and the first duration indicates the first moment.

In an implementation, the first location request includes first indication information, and the first indication information indicates to obtain the locations of the first terminal device and the second terminal device at the same time point.

In an implementation, the processor 901 may be further configured to determine deviation time information of the first terminal device, where the deviation time information is determined based on a time point of positioning a historical location of the first terminal device and a time point of positioning a historical location of the second terminal device. The first location request may include the deviation time information, and the deviation time information is for adjusting a time point of positioning the location of the first terminal device, to enable obtaining the locations of the first terminal device and the second terminal device at the same time point.

In an implementation, the first location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the first location information further includes a time accuracy result, and the time accuracy result indicates whether the locations of the first terminal device and the second terminal device satisfy the time accuracy requirement.

In an implementation, the processor 901 may be further configured to invoke the interface 902 to send a second location request to a second network device, and send a third location request to a third network device, where the second location request is for requesting to obtain a location of the first terminal device at a first moment, and the third location request is for requesting to obtain a location of the second terminal device at the first moment. The processor 901 may be further configured to invoke the interface 902 to receive second location information from the second network device, and receive third location information from the third network device, where the second location information includes the location of the first terminal device at the first moment, and the third location information includes the location of the second terminal device at the first moment.

In an implementation, both the second location request and the third location request include first time information, and the first time information indicates the first moment.

In an implementation, the first time information includes the first moment or first duration, and the first duration indicates the first moment.

In an implementation, the processor 901 may be further configured to determine deviation time information of the first terminal device, where the deviation time information is determined based on a time point of positioning a historical location of the first terminal device and a time point of positioning a historical location of the second terminal device. The second location request may include the deviation time information, and the deviation time information enables adjusting a time point of positioning the location of the first terminal device to the first moment.

In an implementation, the second location request and the third location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the second location information may further include a time accuracy result, and the time accuracy result indicates whether the location of the first terminal device satisfies the time accuracy requirement.

In an implementation, the second network device may be a network device serving the first terminal device; a first measurement device that positions the first terminal device; the first terminal device; or an access network device serving the first terminal device.

When the chip is configured to implement a function of the first network device in embodiments of this disclosure:

The processor 901 is configured to invoke the interface 902 to receive a first location request, where the first location request is for requesting to obtain locations of a first terminal device and a second terminal device at a same time point, and the first network device serves the first terminal device and the second terminal device; and the processor 901 is further configured to invoke the interface 902 to send first location information, where the first location information includes location information of the first terminal device and the second terminal device at the same time point.

In an implementation, the first location request includes first time information, and the first time information indicates a first moment. The first location request is for requesting to obtain locations of the first terminal device and the second terminal device at the first moment.

In an implementation, the first time information includes the first moment or first duration, and the first duration indicates the first moment.

In an implementation, the first location request includes first indication information, and the first indication information indicates to obtain the locations of the first terminal device and the second terminal device at the same time point. The processor 901 may be further configured to determine a first moment, and obtain locations of the first terminal device and the second terminal device at the first moment.

In an implementation, the first location request may include deviation time information of the first terminal device, and the deviation time information is determined based on a time point of positioning a historical location of the first terminal device and a time point of positioning a historical location of the second terminal device. The deviation time information is for adjusting a time point of positioning the location of the first terminal device, to enable obtaining the locations of the first terminal device and the second terminal device at the same time point.

In an implementation, the first location request may include at least one of the following: a time accuracy requirement, where the time accuracy requirement indicates time accuracy that needs to be satisfied by the time point of positioning the location of the first terminal device and a time point of positioning the location of the second terminal device; and second time information, where the second time information indicates that the time point of positioning the location of the first terminal device and the time point of positioning the location of the second terminal device need to be earlier than a second moment.

In an implementation, the first location information further includes a time accuracy result, and the time accuracy result indicates whether the locations of the first terminal device and the second terminal device satisfy the time accuracy requirement.

When the chip is configured to implement a function of the second network device in embodiments of this disclosure:

The processor 901 is configured to invoke the interface 902 to receive a second location request, where the second location request is for requesting to obtain a location of a first terminal device at a first moment; and the processor 901 is further configured to invoke the interface 902 to send second location information, where the second location information includes the location of the first terminal device at the first moment.

In an implementation, the second location request includes first time information, and the first time information indicates the first moment.

In an implementation, the first time information includes the first moment or first duration, and the first duration indicates the first moment.

In an implementation, the second location request may include deviation time information of the first terminal device, and the deviation time information is determined based on a time point of positioning a historical location of the first terminal device and a time point of positioning a historical location of a second terminal device. The deviation time information enables adjusting a time point of positioning the location of the first terminal device to the first moment.

In an implementation, the second location request may include at least one of the following: a time accuracy requirement, where the time accuracy requirement indicates time accuracy that needs to be satisfied by the time point of positioning the location of the first terminal device; and second time information, where the second time information indicates that the time point of positioning the location of the first terminal device needs to be earlier than a second moment.

In an implementation, the first location information further includes a time accuracy result, and the time accuracy result indicates whether the location of the first terminal device satisfies the time accuracy requirement.

When the chip is configured to implement a function of the third network device in embodiments of this disclosure:

The processor 901 is configured to invoke the interface 902 to receive a third location request, where the third location request is for requesting to obtain a location of a second terminal device at a first moment; and the processor 901 is further configured to invoke the interface 902 to send third location information, where the third location information includes the location of the second terminal device at the first moment.

Optionally, the chip further includes a memory 903, and the memory 903 is configured to store a necessary computer program and data.

A person skilled in the art may further understand that various illustrative logical blocks and steps that are listed in embodiments of this disclosure may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this disclosure.

This disclosure further provides a computer-readable storage medium. The computer-readable storage medium stores a computer program. The computer program product includes program instructions. When the program instructions are executed by a computer, a function of any one of the foregoing method embodiments is implemented.

The computer-readable storage medium includes but is not limited to a flash memory, a hard disk, and a solid-state drive.

This disclosure further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs. When the computer program is loaded and executed on a computer, the procedures or functions according to embodiments of this disclosure are all or partially generated. The computer may be a general-purpose computer, a dedicated computer, a computer network, or other programmable apparatuses. The computer program may be stored in a computer-readable storage medium or may be transmitted from a computer-readable storage medium to another computer-readable storage medium. For example, the computer program may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may understand that various numbers such as "first" and "second" in this disclosure are merely used for differentiation for ease of description, and are not used to limit the scope of embodiments of this disclosure or represent a sequence.

"The at least one" in this disclosure may alternatively be described as one or more, and "the multiple" means two, three, four, or more. This is not limited in this disclosure. In embodiments of this disclosure, "first", "second", "third", "A", "B", "C", "D", and the like are used for distinguishing between technical features described by them. There is no chronological order or no size order between the technical features described by "first", "second", "third", "A", "B", "C", and "D".

The correspondences shown in the tables in this disclosure may be configured, or may be predefined. Values of the information in the tables are merely examples, and other values may be configured. This is not limited in this disclosure. When a correspondence between the information and the parameters is configured, not all the correspondences shown in the tables need to be configured. For example, in the tables in this disclosure, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this disclosure may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A location obtaining method, comprising:
   receiving, by a second network device, a second location request comprising first time information, wherein the first time information indicates a first moment for obtaining a first location of a first terminal device, wherein the second location request requests the first location of the first terminal device at the first moment, and wherein the second network device is a core network device; and
   sending, by the second network device and in response to receiving the second location request, second location information comprising the first location.

2. The location obtaining method of claim 1, wherein the first time information comprises the first moment.

3. The location obtaining method of claim 1, wherein the second location request comprises deviation time information of the first terminal device, wherein the deviation time information is based on a first time point of positioning a first historical location of the first terminal device and a second time point of positioning a second historical location of a second terminal device, and wherein the deviation time information is for adjusting the first time information to obtain the first location of the first terminal device and a second location of the second terminal device at the same first moment.

4. The location obtaining method of claim 1, wherein the second location request comprises:
   a time accuracy requirement indicating a time accuracy that needs to be satisfied by a time point of positioning the first location; or
   second time information indicating that the time point needs to be earlier than a second moment.

5. The location obtaining method of claim 1, further comprising:
   sending, by a communication apparatus, the second location request to the second network device; and
   receiving, by the communication apparatus from the second network device, the second location information.

6. The location obtaining method of claim 1, wherein the first time information comprises a time interval.

7. The location obtaining method of claim 1, wherein the first time information indicates a periodic event.

8. The location obtaining method of claim 1, wherein the second network device comprises a gateway mobile location center.

9. A communication system, comprising:
   a communication apparatus configured to send a second location request comprising first time information, wherein the first time information indicates a first moment for obtaining a first location of a first terminal device, and wherein the second location request requests the first location of the first terminal device at the first moment; and a second network device in a core network device and configured to:

receive, from the communication apparatus, the second location request; and send, in response to receiving the second location request and to the communication apparatus, second location information comprising the first location.

10. The communication system of claim 9, wherein the communication system further comprises a third network device configured to:

receive a third location request comprising the first time information, wherein the third location request requests a second location of a second terminal device at the first moment; and send, in response to receiving the third location request, third location information comprising the second location.

11. The communication system of claim 9, wherein the first time information comprises the first moment.

12. The communication system of claim 9, wherein the second network device comprises a gateway mobile location center.

13. A second network device, comprising:

a memory configured to store instructions; and a processor coupled to the memory and configured to execute the instructions to:

receive a second location request comprising first time information, wherein the first time information indicates a first moment for obtaining a first location of a first terminal device, wherein the second location request requests the first location of the first terminal device at the first moment, and wherein the second network device is a core network device; and send, in response to receiving the second location request, second location information comprising the first location.

14. The second network device of claim 13, wherein the first time information comprises the first moment.

15. The second network device of claim 13, wherein the first time information comprises a time interval.

16. The second network device of claim 13, wherein the second network device comprises a gateway mobile location center.

17. A communication apparatus, comprising:

a memory configured to store instructions; and a processor coupled to the memory and configured to execute the instructions to:

send, to a second network device, a second location request comprising first time information, wherein the first time information indicates a first moment for obtaining a first location of a first terminal device, wherein the second location request requests the first location of the first terminal device at the first moment, and wherein the second network device comprises a core network device;

send, to a third network device, a third location request comprising the first time information, wherein the third location request requests a second location of a second terminal device at the first moment;

receive, from the second network device, second location information comprising the second location; and receive, from the third network device, third location information comprising the second location.

18. The communication apparatus of claim 17, wherein the first time information comprises the first moment.

19. The communication apparatus of claim 17, wherein the second location request comprises a time accuracy requirement indicating a time accuracy that needs to be satisfied by a time point of positioning the first location.

20. The communication apparatus of claim 17, wherein the second location request comprises second time information indicating that a time point of positioning the first location needs to be earlier than a second moment.

* * * * *